(12) United States Patent
Han et al.

(10) Patent No.: US 10,514,215 B2
(45) Date of Patent: Dec. 24, 2019

(54) MICROSPHERE-BASED COATINGS FOR RADIOACTIVE COOLING UNDER DIRECT SUNLIGHT

(71) Applicant: STC.UNM, Albuquerque, NM (US)

(72) Inventors: Sang Eon Han, Albuquerque, NM (US); Sang M. Han, Albuquerque, NM (US)

(73) Assignee: STC. UNM, Albuquerque, NM (US)

( * ) Notice: Subject to any disclaimer, the term of this patent is extended or adjusted under 35 U.S.C. 154(b) by 0 days.

(21) Appl. No.: 15/768,829

(22) PCT Filed: Oct. 17, 2016

(86) PCT No.: PCT/US2016/057407
§ 371 (c)(1),
(2) Date: Apr. 16, 2018

(87) PCT Pub. No.: WO2017/066795
PCT Pub. Date: Apr. 20, 2017

(65) Prior Publication Data
US 2019/0056184 A1 Feb. 21, 2019

Related U.S. Application Data

(60) Provisional application No. 62/242,483, filed on Oct. 16, 2015, provisional application No. 62/293,225, filed on Feb. 9, 2016.

(51) Int. Cl.
| | | |
|---|---|---|
| F28F 13/18 | (2006.01) | |
| F24S 70/20 | (2018.01) | |
| F25B 23/00 | (2006.01) | |

(52) U.S. Cl.
CPC ............ *F28F 13/185* (2013.01); *F24S 70/20* (2018.05); *F25B 23/003* (2013.01);
(Continued)

(58) Field of Classification Search
CPC ..... Y10T 428/24802; Y10T 428/24893; Y10T 428/24942; F28F 13/185; F25B 23/003
See application file for complete search history.

(56) References Cited

U.S. PATENT DOCUMENTS

| | | | |
|---|---|---|---|
| 2010/0155043 A1 | 6/2010 | Smith | |
| 2014/0118815 A1* | 5/2014 | Cho | G02B 5/206 |
| | | | 359/278 |
| 2016/0033685 A1* | 2/2016 | Alvine | G02B 1/118 |
| | | | 216/24 |

FOREIGN PATENT DOCUMENTS

| | | |
|---|---|---|
| JP | 07261156 A | 10/1995 |
| WO | 2002098996 A1 | 12/2002 |

(Continued)

OTHER PUBLICATIONS

Whitney, H. M. et al. Floral iridescence, produced by diffi-active optics, acts as a cue for animal pollinators. Science 323, 130-133 (2009).

(Continued)

*Primary Examiner* — Gerard Higgins
(74) *Attorney, Agent, or Firm* — Keith Vogt, Ltd.; Keith A. Vogt

(57) ABSTRACT

The present prevention provides a surface coating for cooling a surface by light scattering comprising a plurality of successive layers, each of the layers may be comprised of a plurality of spheres arranged to form a structure comprised of packed spheres. Each layer may have a different arrangement of packed spheres to create to a different light scattering property in each of the layers. The coating of the structures may also be formed by randomly packed spheres and the spheres may have a uniform diameter.

10 Claims, 11 Drawing Sheets

(52) U.S. Cl.
CPC ....... *F28F 2245/06* (2013.01); *F28F 2270/00* (2013.01); *Y02E 10/40* (2013.01); *Y10T 428/24802* (2015.01); *Y10T 428/24893* (2015.01); *Y10T 428/24942* (2015.01)

(56) References Cited

FOREIGN PATENT DOCUMENTS

| WO | 2008154694 A1 | 12/2008 |
|---|---|---|
| WO | 2014078223 A1 | 5/2014 |

OTHER PUBLICATIONS

Vukusic, P. & Sambles, J. R. Photonic structures in biology. Nature 424, 852-855 (2003).
Shawkey, M.D., Morehouse, N. I. & Vukusic, P. A protean palette: colour materials and mixing in birds and butterflies. J R. Soc. Interface 6, S221-S231 (2009).
Vignolini, S. et al. Pointillist structural color in Pollia fruit. Proc. Natl. Acad. Sci. 109, 15712-15715 (2012).
Ishimaru, A. Wave Propagation and Scattering in Random Media. vol. 1 (Academic Press, 1978).
Sheng, P. Introduction to Wave Scattering, Localization, and Mesoscopic Phenomena. (Academic Press, 1995).
Anderson, P. W. Absence of diffusion in certain random lattices. Phys. Rev. 109, 1492-1505 (1958).
Donner, C. & Jensen, H. W. Rapid simulation of steady-state spatially resolved reflectance and transmittance profiles of multilayered turbid materials. J Opt. Soc. Am. A 23, 1382-1390 (2006).
Vitkin, I. A., Wilson, B. C. & Anderson, R. R. Analysis of layered scattering materials by pulsed photothermal radiometry: application to photon propagation in tissue. Appl. Opt. 34, 2973-2982 (1995).
Martelli, F., Sassaroli, A., Yamada, Y. & Zaccanti, G. Analytical approximate solutions ofthe time-domain diffusion equation in layered slabs. J Opt. Soc. Am. A 19, 71-80 (2002).
Ripoll, J. et al. Recovery of optical parameters in multiple-layered diffusive media: theory and experiments. J Opt. Soc. Am. A 18, 821-830 (2001).
Schmitt, J. M., Wall, R. T., Zhou, G. X. & Walker, E C. Multilayer model of photon diffusion in skin. J Opt. Soc. Am. A 7,2141-2153 (1990).
Kienle, A. et al. Noninvasive determination of the optical properties of two-layered turbid media. Appl. Opt. 37, 779-791 (1998).
Arridge, S. R., Dehghani, H., Schweiger, M. & Okada, E. The finite element model for the propagation of light in scattering media: A direct method for domains with nonscattering regions. Med. Phys. 27, 252-264 (2000).
Hielscher, A. H., Liu, H., Chance, B., Tittel, F. K. & Jacques, S. L. Time-resolved photon emission from layered turbid media. Appl. Opt. 35, 719-728 (1996).
Schuurmans, F. J.P., Vanmaekelbergh, D., Lagemaat, J. v. d. & Lagendijk, A. Strongly photonic macroporous gallium phosphide networks. Science 284, 141-143 (1999).
Keijzer, M., Star, W. M. & Storchi, P.R. M. Optical diffusion in layered media. Appl. Opt. 27, 1820-1824 (1988).
Dayan, I., Havlin, S. & Weiss, G. H. Photon migration in a two-layer turbid medium a diffusion analysis. J Mod. Opt. 39, 1567-1582 (1992).
Durian, D. J. Influence of boundary reflection and refraction on diffusive photon transport. Phys. Rev. E 50, 857-866 (1994).
Zhu, J. X., Pine, D. J. & Weitz, D. A. Internal reflection of diffusive light in random media. Phys. Rev. A 44, 3948-3959 (1991).
Contini, D., Martelli, F. & Zaccanti, G. Photon migration through a turbid slab described by a model based on diffusion approximation. I. Theory. Appl. Opt. 36, 4587-4599 (1997).
Trombe, F. Nouvelles experiences sur le refroidissement de corps noirs rayonnant sur l'espace. Essais d'un dispositif a cinq etages de radiateurs. C. R. Acad. Sci. Paris 256, 2013-2015 (1963).

Trombe, F., Le Phat Vinh, A. & Le Phat Vinh, M. Influence du gaz carbonique sur les abaissements de temperature obtenus par rayonnesment du corps noir sur l'espace. C. R. Acad. Sci. Paris 258, 5685-5688 (1964) (Translation Only).
Trombe, F., Le Phat Vinh, A. & Le Phat Vinh, M. Description des experiences sur le refroidissement des corps terrestres. J Rech. CNRS 65, 563-580 (1964) (Translation Only).
Raman, A. P., Anoma, Ma, Zhu, L., Rephaeli, E. & Fan, S. Passive radiative cooling below ambient air temperature under direct sunlight. Nature 515, 540-544 (2014).
http://www.eia. gov/consumption/residentiall. accessed Jan. 6, 2016.
Bohren, C. F. & Huffman, D. R. Absorption and Scattering of Light by Small Particles. (John Wiley & Sons, 1983).
Rephaeli, E., Raman, A. & Fan, S. Ultrabroadband photonic structures to achieve high-performance daytime radiative cooling. Nano Lett. 13, 1457-1461 (2013).
http://www.currentresults.com/Weather/New-Mexico/annual-davs-of-sunshine.php , accessed Jan. 6, 2016.
Mavrokefalos, A., Han, S. E., Yerci, S., Branham, M. S. & Chen, G. Efficient light trapping in inverted nanopyramid thin crystalline silicon membranes for solar cell applications. Nano Lett. 12, 2792-2796 (2012).
Han, S. E & Chen, G. Toward the lambertian limit of light trapping in thin nanostructured silicon solar cells. Nano Lett. 10,4692-4696 (2010).
Ghosh, S. et al. Symmetry-breaking nanostructures on crystalline silicon for enhanced light-trapping in thin film solar cells. (under review).
Cai, T. & Han, S. E. Effect of symmetry in periodic nanostructures on light trapping in thin film solar cells. J. Opt. Soc. Am. B 32, 2264-2270 (2015).
Branham, M.S. et al. 15.7% efficient 10-um-thick crystalline silicon solar cells using periodic nanostructures. Adv. Mater. 27,2182-2188 (2015).
Yablonovitch, E. Statistical ray optics. J. Opt. Soc. Am. 72, 899-907 (1982).
Stuart, H. R. & Hall, D. G. Thermodynamic limit to light trapping in thin planar structures. J. Opt. Soc. Am. A 14, 3001-3008 (1997).
Stuart, H. R. & Hall, D. G. Absorption enhancement in silicon-on-insulator waveguides using metal island films. Appl. Phys. Lett. 69, 2327-2329 (1996).
Atwater, H. A. & Polman, A. Plasmonics for improved photovoltaic devices. Nature Mater. 9, 205-213 (2010).
Kayes, B. M. et al. 27.6% Conversion efficiency, a new record for single-junction solar cells under 1 sun illumination. 37th IEEE PVSC 000004-000008 (2011).
Wallin, E., Malm, U., Jarmar, T., Edoff, 0. L. M. & Stolt, L. World-record Cu(In,Ga)Se2-based thin-film sub-module with 17.4% efficiency. Prog. Photovolt: Res. Appl. 20, 851-854 (2012).
Davis, M. W., Fanney, A. H. & Dougherty, B. P. Prediction of building integrated photovoltaic cell temperatures. J. Sol. Energy Eng 123, 200-210 (2001).
Skoplaki, E. & Palyvos, J. A. On the temperature dependence ofphotovoltaic module electrical performance: a review of efficiency/power correlations. Sol. Energy 83, 614-624 (2009).
Rayne, A., Dey, C. J. & Mills, D. R. Cooling ofphotovoltaic cells under concentrated illumination: a critical review. Sol. Energ. Mat. Sol. C. 86, 451-483 (2005).
Teo, H. G., Lee, P. S. & Hawlader, M. N. A. An active cooling system for photovoltaic modules. Appl. Energy 90, 309-315 (2012).
Akbarzadeh, A. & Wadowski, T. Heat pipe-based cooling systems for photovoltaic cells under concentrated solar radiation. Appl. Therm. Eng. 16, 81-87 (1996).
Zhu, L., Raman, A., Wang, K. X., Anoma, M.A. & Fan, S. Radiative cooling of solar cells. Optica 1, 32-38 (2014).
Zhu, L., Raman, A. P. & Fan, S. Radiative cooling of solar absorbers using a visibly transparent photonic crystal thermal blackbody. Proc. Natl. Acad. Sci. 112, 12282-12287 (2015).
Safi, T. S. & Munday, J. N. Improving photovoltaic performance through radiative cooling in both terrestrial and extraterrestrial environments. Opt. Express 23, A1120-A1128 (2015).
Reculusa, S. et al. Syntheses of Raspberrylike Silica/Polystyrene Materials. Chem. Mater. 14, 2354-2359 (2002).

(56) References Cited

OTHER PUBLICATIONS

Reculusa, S. & Ravaine, S. Synthesis of Colloidal Crystals of Controllable Thickness through the Langmuir-Blodgett Technique. Chem. Mater. 15, 598-605 (2003).
Blanco, A. et al. Large-scale synthesis of a silicon photonic crystal with a complete three-dimensional bandgap near 1.5 micrometres. Nature 405, 437-440 (2000).
Wijnhoven, J. E. G. J. & Vos, W. L. Preparation of photonic crystals made of air spheres in titanic. Science 281, 802-804 (1998).
Pusey, P. N. et al. Structure of crystals of hard colloidal spheres. Phys. Rev. Lett. 63, 2753-2756 (1989).
Denny, N. R., Han, S. E., Norris, D. J. & Stein, A. Effects of thermal processes on the structure of monolithic tungsten and tungsten alloy photonic crystals. Chem. Mater. 19, 4563-4569 (2007).
Garcia, P. D., Sapienza, R., Blanco, a. & Lopez, C. Photonic glass: a novel random material for light. Adv. Mater. 19, 2597-2602 (2007).
Van Blaaderen, A., Ruel, R. & Wiltzius, P. Template-directed colloidal crystallization. Nature 385, 321-324 (1997).
Lavernia, E. J. & Wu, Y. Spray Atomization and Deposition. (John Wiley, 1996).
Scardaci, V., Coull, R., Lyons, P. E., Rickard, D. & Coleman, J. N. Spray deposition of highly transparent, low-resistance networks of silver nanowires over large areas. Small?, 2621-2628 (2011).
Fernando, R. H., Xing, L. L. & Glass, J. E. Rheology parameters controlling spray atomization and roll misting behavior of waterborne coatings. Prog. Org. Coat. 40, 35-38 (2000).
Glass, J. E. In "Technology for Waterborne Coatings," American Chemcial Society Symposium Series 663. 265-295.
Lin, S. Y. et al. A three-dimensional photonic crystal operating at infrared wavelengths. Nature 394, 251-253 (1998).
Ho, K. M., Chan, C. T., Soukoulis, C. M., Biswas, R. & Sigalas, M. Photonic band gaps in three dimensions: New layer-by-layer periodic structures. Solid State Commun. 89, 413-416 (1994).
Burresi, M. et al. Bright-white beetle scales optimise multiple scattering of light. Sci. Rep. 4, 6075 (2014).
Edagawa, K, Kanoko, S. & Notomi, M. Photonic amorphous diamond structure with a 3D photonic band gap. Phys. Rev. Lett. 100, 013901 (2008).
Storzer, M., Gross, P., Aegerter, C. M. & Maret, G. Observation of the critical regime near Anderson localization of light. Phys. Rev. Lett. 96, 063904 (2006).
Wiersma, D. S., Bartolini, P., Lagendijk, A. & Righini, R. Localization of light in a disordered medium. Nature 390, 671-673 (1997).
Van der Beek, T., Barthelemy, P., Johnson, P.M., Wiersma, D. S. & Lagendijk, A. Light transport through disordered layers of dense gallium arsenide submicron particles. Phys. Rev. B 85, 115401 (2012).
Xia, D., Biswas, A., Li, D. & Brueck, S. R. J. Directed self-assembly of silica nanoparticles into ianometer-scale patterned surfaces using spin-coating. Adv. Mater. 16, 1427-1432 (2004).
Stober, W., Fink, A. & Bohn, E. Controlled growth of monodisperse silica spheres in the micron size range. J. Colloid Interface Sci. 26, 62-69 (1968).
Burmeister, F. et al. From mesoscopic to nanoscopic surface structures: Lithography with colloid monolayers. Adv. Mater. 10, 495-497 (1998).
Johnson, P.M. & Lagendijk, A. Optical anisotropic diffusion: new model systems and theoretical modeling. J. Biomed. Opt. 14, 054036 (2009).
Alerstam, E. Anisotropic diffusive transport: Connecting microscopic scattering and macroscopic transport properties. Phys. Rev. E 89, 063202 (2014).
Kienle, A. Anisotropic light diffusion: An oxymoron? Phys. Rev. Lett. 98, 218104 (2007).
SperlingT, BuhrerW, Aegerter, C. M. & MaretG. Direct determination of the transition to localization of light in three dimensions. Nature Photon. 7, 48-52 (2013).
Sapienza, R. et al. Observation of resonant behavior in the energy velocity of diffused light. Phys. Rev. Lett. 99, 233902 (2007).
Gottardo, S. et al. Resonance-driven random lasing. Nat. Photon. 2, 429-432 (2008).
Granqvist, C. G. & Hjortsberg, A. Radiative cooling to low temperatures: General considerations and application to selectively emitting SiO films. J Appl. Phys. 52, 4205-4220 (1981).
Atiganyanun, Sarun, et al; Control of Randomness in Microsphere-Based Photonic Crystals Assembled by Languir-Blodgett Process; Langmuir 2017, 33, 13783-13789; American Chemical Society.
Federal Institute of Industrial Property; International Search Report & Written Opinoin for PCT/US2016/057407; 6 pages; dated Apr. 20, 2017; Moscow, RU.

* cited by examiner

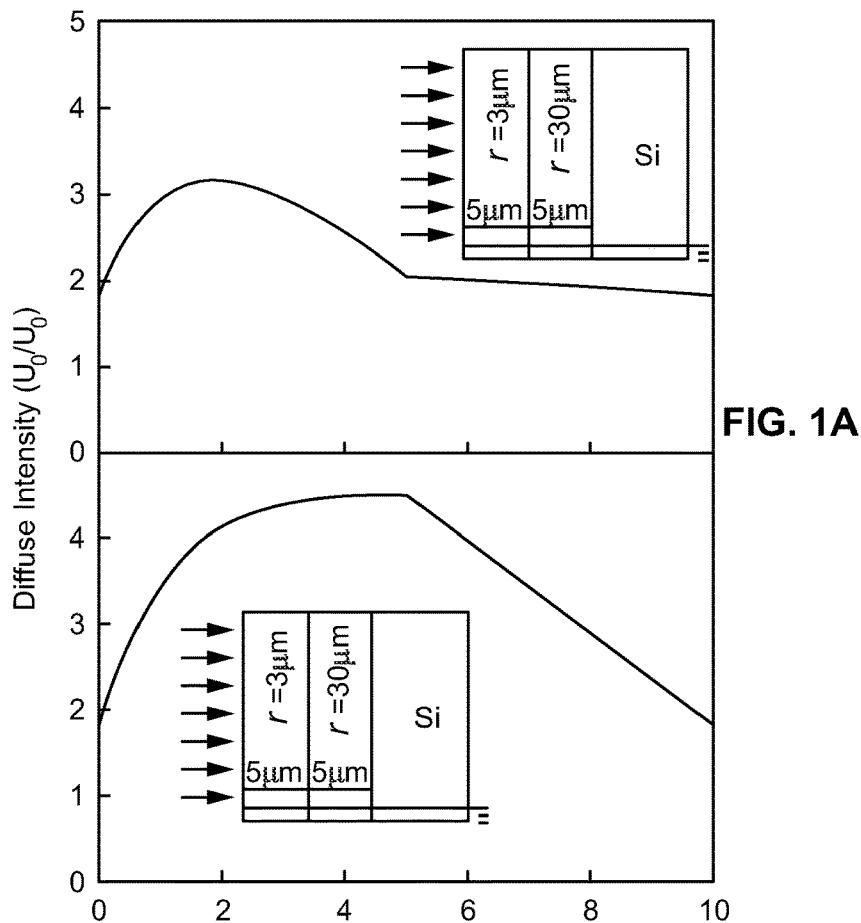
FIG. 1A
FIG. 1B
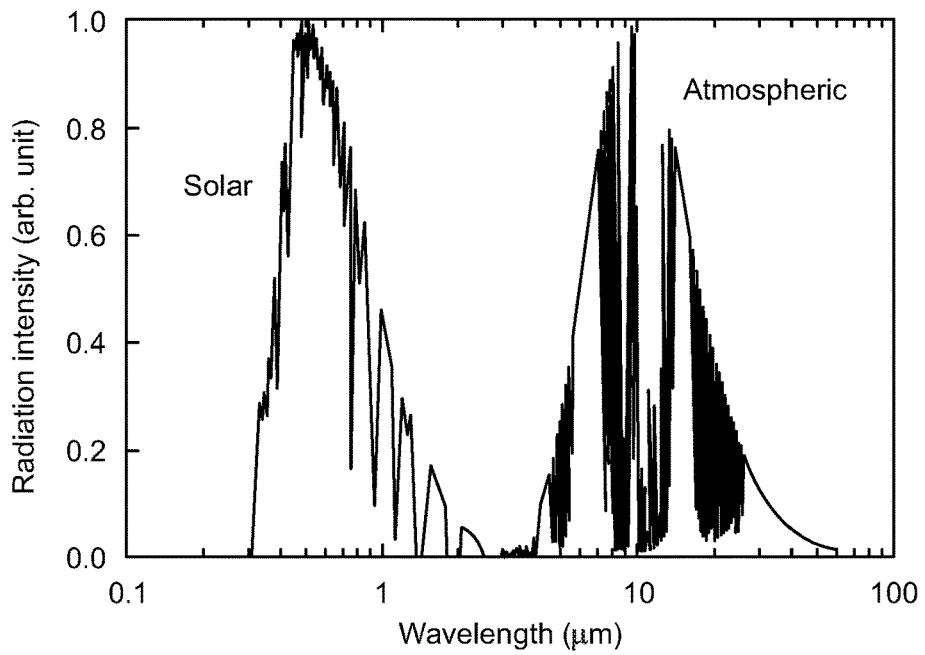
FIG. 2

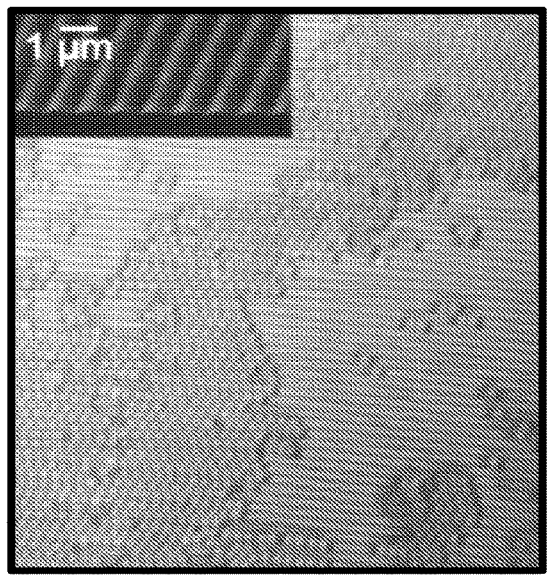
FIG. 9
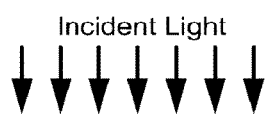
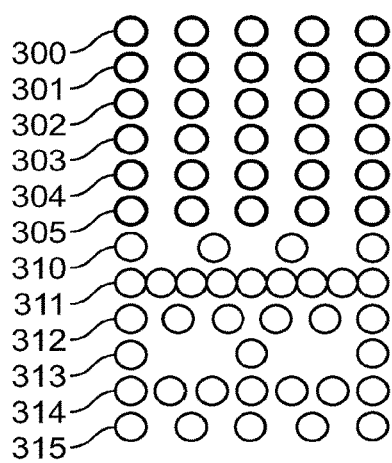
FIG. 10A
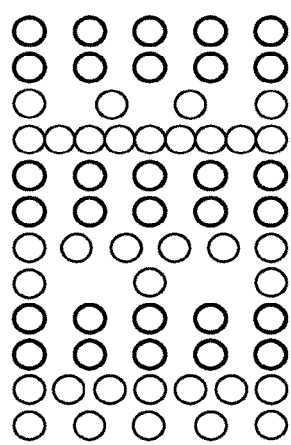
FIG. 10B
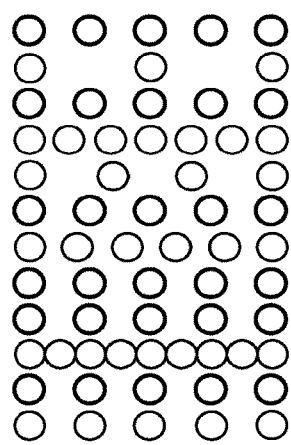
FIG. 10C

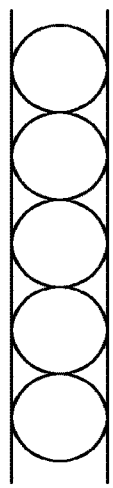
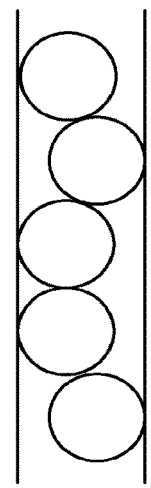
FIG. 11A  FIG. 11B
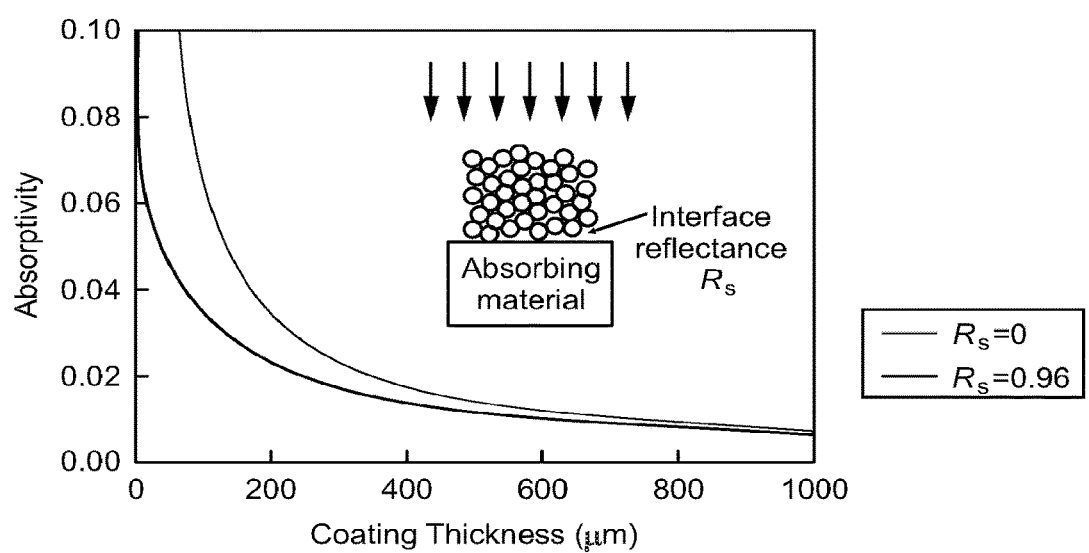
FIG. 12

MICROSPHERE-BASED COATINGS FOR RADIOACTIVE COOLING UNDER DIRECT SUNLIGHT

RELATED APPLICATIONS

This application claims the benefit of U.S. Provisional Application No. 62/242,483, filed Oct. 16, 2015 and herein incorporated by reference. This application also claims the benefit of U.S. Provisional Application No. 62/293,225, filed Feb. 9, 2016 and herein incorporated by reference.

BACKGROUND OF THE INVENTION

In the field of photonic crystals—artificial materials that possess a periodicity on the order of an optical length scale, the structural disorder is a problem in many cases as it scatters light randomly. While defects can be intentionally introduced in photonic crystals for light localization, random scattering of light in photonic crystals is in general a consequence of fabrication errors. However, curiously, many photonic patterns found in animals and plants are not perfectly periodic. For example, butterfly wings, humming birds, or blue Pollia fruits generate iridescent colors by employing periodic structures but the structures involve a degree of disorder that is much greater than that in typical photonic crystals fabricated by current nanopatterning techniques. If the structures in nature have been optimized, as generally thought, over hundreds of million years of evolution for various purposes such as signaling, mating, camouflage, and seed dispersing, it may suggest that a certain degree of structural randomness is actually not only favorable but even required for the best optical performance in many applications.

When structural randomness is present, light propagation can be divided into two modes: direct propagation and random scattering. The random scattering resembles diffusive transport of particles in many respects. In the diffusion picture of light propagation, energy packets are considered to perform a random walk due to the irregular structures. An important parameter in this picture is the transport mean free path, $l^*$, which is defined as the average distance that an energy packet travels before its propagation direction has no correlation with its original direction. The transport mean free path is to be distinguished from the scattering mean free path, $l$, which is the average distance over which light propagates without scattering. Therefore, $l^*$ is larger than $l$ and they are closer to each other as the scattering of a constituent particle is stronger. While the diffusion picture considers the transport of energy packets only, the wave nature of light such as interference is still preserved in random media. For example, back scattered light interferes always constructively and multiply scattered light can be localized in strongly scattering media due to interference, a phenomenon known as Anderson localization. In the embodiments of the present invention, the scattering, in most instances, will not be very strong, so that $kl \gg 1$, where $k=2\pi n/\lambda$ with $\lambda$ the wavelength of light in free space and $n$ the average refractive index of the random media. Therefore, the light transport in the proposed work is well described by the diffusion picture.

Materials can cool under direct sunlight even below an ambient temperature. The cooling effect is achieved by minimizing solar absorption and maximizing heat radiation into an atmospheric window which is mostly within 8-13 μm in light wavelength. Prior art in a patent US 2014/0131023 achieved the cooling effect using multilayer structures. However, in these structures, the thickness of each layer needs to be precisely controlled within a few nanometers to efficiently block sunlight absorption. The sunblock performance of these structures degrades when applied to surfaces of high curvatures. Moreover, for practical applications, the fabrication of many layers over a large area presents manufacturing challenges in terms of throughput and cost. In comparison, paint-based coatings are much more convenient and cost-effective. Paints can be applied on highly curved surfaces without loss in cooling performance. Further, no precision control is required in applying paints on surfaces.

Solar heat preventive paints are typically based on particles of silica, borosilicate, titania, etc. While pigments that are non-white and highly reflective in near-infrared (IR) are used to reduce solar heating, these pigments are absorptive in the visible spectrum and hence less effective in cooling. For white paints, when the pigments are made of low refractive index materials such as silica, the particles are of a hollow spherical shell shape to enhance sunlight scattering. As in a U.S. Pat. No. 7,503,971, these particles are typically large compared to solar spectral wavelengths and ranges from 20 to 150 μm in size. As the particle size is large, the sunlight scattering efficiency is low and thick coatings are required to efficiently block sunlight. For high refractive index particles such as titania, current paint technology has determined that the particle size should be close to 200-250 nm to maximize whiteness of coatings.[1,2] While this size maximizes the scattering of visible wavelengths, these coatings suffer from solar heating due to weak scattering of near IR. Even commercial solar IR-blocking paints use particles of 200-250 nm in size.

BRIEF SUMMARY OF THE INVENTION

In one embodiment, the present invention provides a significant departure from the conventional approaches, where the entire microsphere packing assumes a specifically ordered photonic lattice structure or a completely random photonic glass structure.

In yet other embodiments, the present invention provides optimum particle sizes and volume fractions to maximize the cooling effect of paints under direct sunlight.

In one embodiment, the present invention provides designs and fabrication methods to create tiered structures. Each tier may be a monolayer or multilayer of microspheres with a prescribed degree of randomness. Each tier may also assume a well-defined structure with a lateral periodicity. The random and well-defined structures may also alternate from tier to tier.

In one embodiment, the present invention uses structural manipulation and an understanding of light scattering in the microsphere media to tailor light absorption in the materials that sit underneath the scattering media in a prescribed fashion. For instance, such manipulation allows efficient control of light scattering to realize coatings that (1) prevent or (2) optimally allow sunlight absorption in the underlying materials.

In other embodiments, the coatings may simultaneously and efficiently remove heat by thermal radiation, so that the underlying materials cool even under the direct sunlight. In a preferred embodiment, when the coatings when the coatings of the present invention provide strong light scattering to prevent sunlight absorption, the temperature of the underlying material may be 30 to 40° C. below the ambient temperature even under the direct sunlight. Such passive cooling effect would be tremendously beneficial to energy savings for summer time with zero operating cost. In another preferred embodiment of the present invention, for optimal sunlight absorption, the coatings efficiently trap sunlight in the underlying material, while radiatively removing heat from the underlying material. This efficient light trapping and cooling would be particularly beneficial in achieving high efficiency in solar cells.

In yet other embodiments, the present invention provides microsphere-based coatings that are inexpensive and amenable to high throughput processing for manufacturability with applications in energy harvesting, building construction, transportation, space vehicles, and electronic displays.

In other embodiments, the present invention enables controlled light scattering including extremely strong and weak scattering.

In other embodiments, the present invention provides material temperatures that are 30-40° C. below the ambient temperature under direct sunlight will be realized by passive radiative cooling using inexpensive microsphere-based coatings.

In other embodiments, the present invention provides both light trapping and radiative cooling at the same time in solar cells using microsphere-based coatings.

In another embodiment, the present prevention provides a surface coating for cooling a surface by light scattering comprising a plurality of successive layers, each of the layers comprised of a plurality of spheres arranged to form a structure comprised of packed spheres or non-packed spheres and each structure of each layer has a different arrangement of packed spheres or non-packed spheres to create to a different light scattering property in each of the layers. The coating of the structures may also be formed by randomly packed spheres and the spheres may have a uniform diameter. In yet other embodiments, the coating reflects and emits light in a range of 8-13 microns. In yet another embodiment, the coating reflects and/or emits light in a range of 18-30 microns.

In yet another embodiment, the coatings of the present invention have spheres that are comprised of hollow spheres having a shell that traps a gas inside the sphere, the shell has refractive index that is different than the gas. The spheres may range in size from 1-3 microns and the shells may have a thickness that ranges in size from 1-10 nm.

In still further embodiments, the coating has layers which may have a fixed periodicity and the periodicity of each layer is different. The layers may alternate between periodic and non-periodic structures.

In yet other embodiments, the coatings have structures which may be made of multilayers of spheres with a predetermined degree of randomness. In some embodiments, the periodic layers are ordered structures and the non-periodic structures are random structures. In further embodiments, the layers are made of a monolayer of microspheres with a predetermined degree of randomness.

In a preferred embodiment, the coatings of the present invention are constructed of layers in the layers have a sphere filling fraction of less than 55% or between 20-45% and said spheres have a diameter between 0.4 and 1 micron. In other aspects, the layers have a sphere filling fraction of less than 30% and the spheres have a diameter of 1 micron or less.

In yet other embodiments, the coatings of the present invention may be comprised of layers which have spheres joined into fibrillar networks and the fibrillar networks of each layer have different periodicities and orientations.

In yet other embodiments, the present invention provides methods for cooling a substrate by applying a coating to the surface of the substrate comprising the steps of applying layers of spheres wherein the cooling power is enhanced by decreasing the sphere filling fraction to a filling fraction of less than 55% in each of the layers. In other aspects, the filling fraction is less than 30% and the spheres have a uniform diameter of 1 micron or less.

In yet other embodiments, the method of the present invention includes creating monolayers of hexagonally arranged spheres which are transferred onto the substrate. In other aspects, the transferring step is repeated to form multiple layers on the substrate. In yet other aspects, the transferring step is repeated to form multiple layers on the substrate with each layer having a differing arrangement of spheres by varying the surface pressure used to make each layer, by varying the substrate pulling speed used to make each layer, or both.

In other embodiments, the layers may be comprised of tiers of randomly distributed spheres and the degree of randomness of each tier with each successive layer added to the substrate increases or varies. The layers may be made using the sedimentation of colloidal spheres to create random layers of microspheres. The spheres and substrate may also be adapted to have attractive charges to create random layers of microspheres.

In addition, in other embodiments the random layers are made by inducing colloidal instability.

In yet other embodiments, the layers are made using spray coating for the fabrication of randomly packed spheres and the spheres and the substrate are adapted to have attractive charges to cause the spheres bind together and to the substrate to have a random sphere packing density that is lower than 55%. In other aspects, the coating is applied at a temperature of ~130° C.

In yet other embodiments, the method of the present invention includes applying a coating to the surface of a substrate comprising the steps of applying spheres arranged in fibrillar networks to form successive layers of spheres and wherein at least one of the fibrillar networks may include at least one kinked chain of microspheres.

In yet other embodiments, the method of the present invention includes applying a coating to the surface of a substrate comprising the steps of applying polyethylene by fiber spinning to create layers of fibrillar networks.

In yet other embodiments, the method of the present invention includes applying a coating to the surface of a substrate by depositing polyethylene to the substrate surface. In other aspects, the polyethylene is co-deposited with one or more other materials that are subsequently etched away.

In yet other embodiments, the method of the present invention includes applying a coating to the surface of a substrate by forming microbubbles within a polyethylene film that is applied to the surface of a substrate. In other aspects, etching is used to form the microbubbles.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

FIGS. 1A and 1B illustrate diffuse intensity distribution in the two tiers of randomly packed $SiO_2$ spheres on Si (FIG. 1A) when the first and second tiers have l*=3 μm and 30 μm, respectively and (FIG. 1B) when the two tiers are interchanged. Light is incident on z=0 plane as shown in insets.

FIG. 2 illustrates intensity spectra of solar radiation and atmospheric radiation. Each is normalized to its maximum intensity.

FIG. 9 is an illustrates an SEM image of microspheres coated on c-Si grooves by LB technique.

FIG. 10A shows a schematic illustration of order-disorder mixing in fibrillar network structures with separate ordered layers (bold circles) and disordered (circles) layers.

FIG. 10B shows intermediate mixing of layers.

FIG. 10C shows random mixing of the original ordered and disordered layers.

FIG. 11A illustrates a straight sphere chain depending on the groove width.

FIG. 11B illustrates a non-straight sphere chain depending on the groove width.

FIG. 12 illustrates calculated solar absorptivity of randomly packed $SiO_2$ spheres on an absorbing material as a function of the sphere coating thickness at the interface reflectance of 0 and 0.96.

(FIG. 14A) l*=3 μm and (FIG. 14B) l*=200 μm.

DETAILED DESCRIPTION OF THE INVENTION

Figure 3:
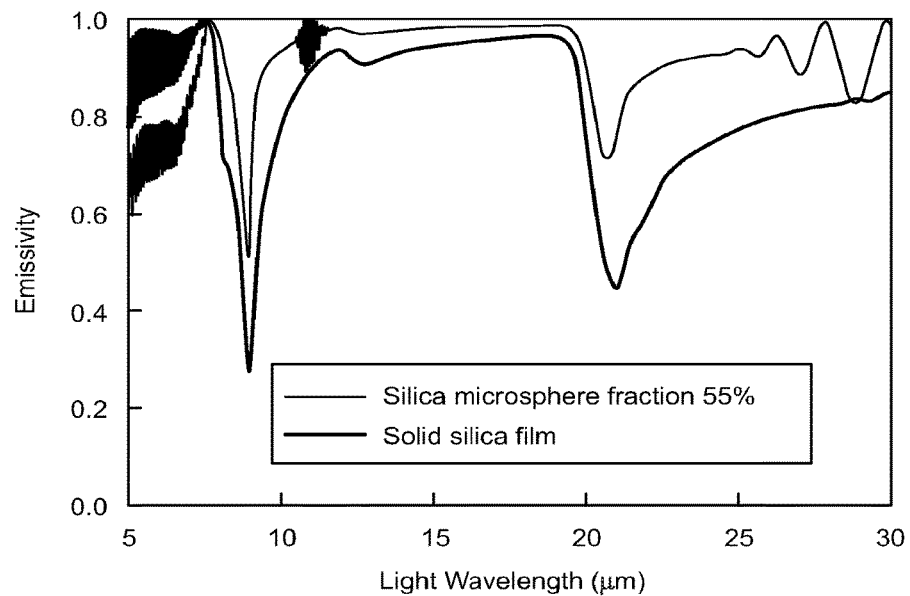
FIG. 3 is a Mid-IR emissivity spectrum of solid silica film and silica microsphere packing of 55%. The thickness of both films is 100 μm and normal direction of emission is considered.

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

In one embodiment of the present invention, control of light scattering is obtained by using tiered structures where each tier has its own predetermined characteristic scattering properties. For example, FIG. 1 shows diffuse intensity distribution in the two tiers of l*=3 μm and 30 μm on Si. In FIG. 1, $U_d$ is the diffuse component of the intensity inside the tiers and $U_0$ is the intensity of incident light. When the two tiers are interchanged, the diffuse intensity distribution is drastically modified. This permits the fabrication of a plurality of tiers of varying degrees of randomness as well as versatile control of scattering properties.

The diffusion model gives the steady state diffusion equation for light propagation in a slab in the z-direction that is normal to the slab surface as $$\frac{d^2 U_d}{dz^2} = -\frac{3}{l^2} U_0 e^{-z/l}. \tag{1}$$

The ballistic component of the intensity in the media is given by $$U_b = U_0 e^{-l/l}. \tag{2}$$

When the thickness of the slab, L, is much larger than l*, the solution to Eq. (1) with appropriate boundary conditions gives transmittance $$T \cong \frac{1+z_e}{L/l^* + 2z_e}, \quad (3)$$

where $z_e$ is the extrapolation length normalized by $l^*$ and the extrapolation length is the distance outside the slab over which the diffuse intensity vanishes. When the internal reflectance at the boundaries is R, the extrapolation length ratio is given by $$z_e = \frac{2}{3}\frac{1+R}{1-R}. \quad (4)$$

Equation (3) shows that, roughly, transmittance in a thick slab is inversely proportional to the thickness. With transmittance measurement at various thicknesses, $l^*$ and $z_e$ can be experimentally determined using Eq. (3). The l can be determined from the ballistic transmittance of, desirably, thin samples. Therefore, the scattering parameters of each tier in a multi-tiered stack can be obtained from the measurement on the uniform slabs of the same scattering properties as each tier.

The scattering properties of the multi-tiered stack may be predicted by solving the diffusion equation with the obtained parameters. Angle-dependent internal reflectance in the equation may also be considered because it can account for the change in the diffuse transmission and reflection when the tier distribution in multi-tiered structures is modified. In solving the diffusion equation, $z_e$ would be close to ⅔ for the boundaries between the tiers according to Eq. (4) because the internal reflection at the boundaries would be small.

In other applications, the embodiments of the present invention may be used with solar energy in heating and cooling applications. For example, solar collectors concentrate sunlight in a small area covered with solar selective surfaces. These selective surfaces, that are housed in a vacuum, absorb sunlight strongly while minimizing thermal radiation loss in mid-infrared (mid-IR). Compared to heating, the possibility of cooling by preventing sunlight absorption and maximizing thermal radiation is much less recognized. However, it has been demonstrated that radiative cooling by a purely passive way can achieve temperatures lying almost 40° C. below the ambient temperature at night. Moreover, studies have shown that, even under direct sunlight, materials can be radiatively cooled to temperatures that are 5° C. below the ambient temperature. The remarkable radiative cooling performance shows that the passive cooling technology of the embodiments of the present invention have great potential for widespread use in buildings. The inexpensive radiation cooling technology of the present invention may save electrical energy consumption in residential buildings substantially because 87% of U.S. households are equipped with air conditioners. In addition to air conditioning in residential buildings, the potential applications of radiative cooling of the present invention has application in various interior/exterior automotive parts, outdoor non-residential construction walls, chemical container tanks, electronic devices with hot spots, and so on.

The cooling power of a material under sunlight is defined by $$P_{cool}(T) = P_{rad}(T) - P_{atm}(T_{amb}) - P_{sun} - P_{other}, \quad (5)$$

where $P_{rad}$ is the power radiated by the material, $P_{atm}$ is the power absorbed by the material from the atmospheric radiation, $P_{sun}$ the power absorbed by the material from the solar radiation, $P_{other}$ is the power transferred to the material from other sources typically by conduction and convection, T is the material temperature, and $T_{amb}$ is the ambient temperature. T is lowered as the cooling process proceeds and reaches a final value when the cooling power becomes zero. The cooling power is calculated using the standard solar spectrum such as AM1.5G for $P_{sun}$ and the mid-IR atmospheric radiation spectra for $P_{atm}$. The solar and atmospheric radiation spectra are shown in FIG. 2 where each spectrum is normalized by its maximum intensity. These two spectra have little overlap with each other so that each can be controlled separately. The black body radiation power at 25° C. is ~450 W/m² which is comparable to the solar power that is ~1000 W/m². Therefore, the control of both solar absorptivity and mid-IR emissivity of a material has substantial effect on the cooling power.

In the mid-IR, $P_{rad}$ and $P_{atm}$ have opposite effects on cooling. If atmospheric radiation were a black body spectrum, these two would be the same at the same temperature. This is because of the Kirchhoff's law which states that absorptivity is the same as emissivity at equilibrium. Thus, if the atmosphere were a black body, the power radiated from the material would be the same as the absorbed power by the material. However, the atmospheric radiation spectrum in FIG. 2 exhibits a wavelength interval 8≤λ≤13 μm where the radiation is minimal Thus, if the material radiates into this window strongly while the radiation is suppressed in the other spectral regions, the heat exchange between the material and the atmosphere would be minimized so that the cooling is facilitated. It has long been recognized that the ideal emissivity consists of 1 within the atmospheric window and 0 otherwise. However, actual experiment has revealed negligible difference in the sample temperature between a material close to the ideal emissivity and another close to a black body.

For certain embodiments of the present invention, it has been found that the cooling power of a mid-IR black body is actually larger than that of an ideal emissivity material. Therefore, for maximum cooling, the material should exhibit high emissivity in the broad mid-IR range and low absorptivity in the solar spectrum.

For high emissivity in the mid-IR, many polar materials may be used such as $SiO_2$, SiO, SiC, $TiO_2$, $HfO_2$, $Al_2O_3$, ZnO, etc. These materials exhibit resonances in the mid-IR due to atomic vibrations. The resonances are manifest as a strong dispersion in the dielectric function. This dispersion typically involves not only high absorption peaks but also high reflection. For maximum cooling, the reflection should be minimized. In certain embodiments, the present invention reduces the reflection loss due to increase emission using microsphere-based structures. In the mid-IR, the photon wavelength (~10 μm) is much greater than the size of the microspheres (~1 μm). In this case, mid-IR light does not "see" the detailed structures and responds roughly to an average of the dielectric function. Based on the effective medium theory, which finds the average dielectric function, reflection decreases as the filling fraction of the microspheres decreases. For example, FIG. 3 compares the calculated mid-IR emissivity spectrum of a solid $SiO_2$ film and a film of $SiO_2$ microspheres of 55% filling fraction. The calculation is based on Maxwell-Garnett effective medium theory and the films are thick (100 μm). The $SiO_2$ microspheres show high emissivity in the mid-IR and the emissivity is enhanced compared to a solid $SiO_2$ film. Therefore, the cooling power can be enhanced by decreasing the microsphere filling fraction in the structures for thick films.

In certain embodiments, the present invention concerns radiative cooler coatings adapted for use with sunlight which consist of multilayer stacks with photonic band gaps to reduce sunlight absorption. In other embodiments, fabrication of the structures involves layer-by-layer deposition processes with a precise control of the thickness of each layer. Moreover, for efficient suppression of the broad solar absorption, a large number of layers with several different periodicities are required in the multilayer stack. For example, a previous study used 30 layers to achieve a 3.5% solar absorptivity. When many layers are used, the fabrication cost and time would not be within the practical bounds. The embodiments of the present invention overcome this known problem and achieve similar or even better cooling performance using random arrangements of microspheres. The coatings of the present invention allow for inexpensive manufacturing without requiring precision control. The microsphere-based coatings of the present invention can scatter incident light back to the atmosphere so that solar absorption is reduced. Even when the coating needs to be thick, the thickness does not matter much in terms of the manufacturing and material cost.

The radiative cooling is expected to be most effective in regions of dry atmosphere such as the State of New Mexico (NM). This is because the moisture in the atmosphere is a strong absorber of certain bands in the mid-IR. In particular, the atmospheric transparent window $8 \leq \lambda \leq 13$ µm is significantly affected by the water vapor absorption. Thus, as the atmosphere becomes more humid, the atmospheric radiation becomes closer to the black body radiation and the radiative cooling effect decreases. Because of the low relative humidity in NM, the radiative cooling technology of the microsphere-based coatings of certain embodiments of the present invention would be greatly beneficial. Moreover, the effective sunlight scattering of the coatings would prevent solar heating in regions of strong sunshine. For example, in the city of Albuquerque in N. Mex., average 278 days per year are sunny or partly sunny days.

Light trapping is important in various optoelectronic applications. For example, for solar photovoltaics, light trapping inside photoactive layers enhances energy conversion efficiency. It has also been demonstrated that photonic nanostructures that are highly efficient in light trapping in silicon solar cells. The structures diffract light into the underneath film and light is trapped in the film through resonances. An alternative strategy for light trapping is to randomly corrugate the film surface. For the present invention, when the film is much thicker than the light wavelength, the light trapping reaches the thermodynamic limit known as the Lambertian limit. The Lambertian light trapping is approximately realized in silicon solar cells by randomly corrugating the silicon surface. While this strategy is already used in commercial silicon cells, its usefulness in thin-film photovoltaics is highly questioned because a significant part of the expensive photoactive layer is lost by texturing. In contrast, additive techniques can also be used. For example, random metallic particles can be added on thin solar cells for light trapping. However, the plasmonic resonances in the particles involve significant optical loss. Thus, this technique is not commonly used for high efficiency solar cells such as GaAs or CIGS based cells. In certain embodiments of the present invention, a different approach that relies on random packing of microspheres to realize the Lambertian light trapping is used.

The microsphere-based coatings of the present invention control randomness to minimize reflection loss, while randomizing the light path. The degree of randomness is an important parameter that determines the level of light trapping. When the coating scatters light too strongly, a significant fraction of the incident light will be back-scattered as optical loss. If the scattering is too weak, the light path randomization will be difficult. Thus, embodiments of the present invention adjust the randomness in the microsphere-based coating to realize the Lambertian light trapping with minimal reflection loss.

It has long been noted that the efficiency of solar cells deteriorates as they are heated under sunlight. The typical temperature difference between a solar cell and the atmosphere is 50-60° C. at the solar irradiance of 1000 W/m². For silicon solar cells that exhibit 25% efficiency at 25° C., the efficiency drops to ~21% when the cell temperature reaches 55° C. The heating problem in solar cells becomes even more serious when they operate with sunlight concentration. To prevent heating of solar cells, various heat removal systems based on convection and conduction have been considered. More recently, it was demonstrated that radiative cooling will also be effective in increasing solar cell efficiency. For radiative cooling, a promising experimental study used periodic $SiO_2$ structures on silicon cells. These structures reduced the temperature of a silicon solar cell by 13° C. However, the light trapping effect of the structures was only slight. Moreover, the structures raise practical fabrication issues. For example, the deposition of 500-µm-thick $SiO_2$ films (the study used a $SiO_2$ plate and an index matching liquid, which would still not be very practical) and the reactive ion etching of a 10-µm-depth on the film would be time consuming and expensive. In comparison, the microsphere-based coatings of the present invention enable much simpler processing. Further, the mid-IR emissivity of the coatings is very high as shown in FIG. 3. Certain embodiments of the present invention have achieved 94.3% emissivity averaged over the mid-IR emission spectrum and angle. Therefore, the microsphere-based coatings of certain embodiments of the present invention are very effective in removing heat in solar cells and efficient light trapping is realized with the coatings without decreasing the high mid-IR emissivity.

Langmuir-Blodgett (LB) technique is commonly used to self-assemble monolayers on a substrate. In this technique, a monolayer of hexagonally close-packed structures is formed on a liquid surface is then transferred onto a substrate that is vertically pulled out of the liquid. By repeating the process, multilayer sphere arrays may be fabricated. In this case, the degree of randomness typically increases as each layer is added. Thus, structures with graded randomness can be fabricated. Moreover, the degree of disorder in each layer can be controlled.

In one preferred embodiment of the present invention, the degree of randomness will be controlled in each layer in the LB assembly. The disorder may be characterized by image analysis after adding each layer. Light scattering may be characterized by measuring transmission and reflection for $SiO_2$ and $TiO_2$ microspheres.

Figure 4:
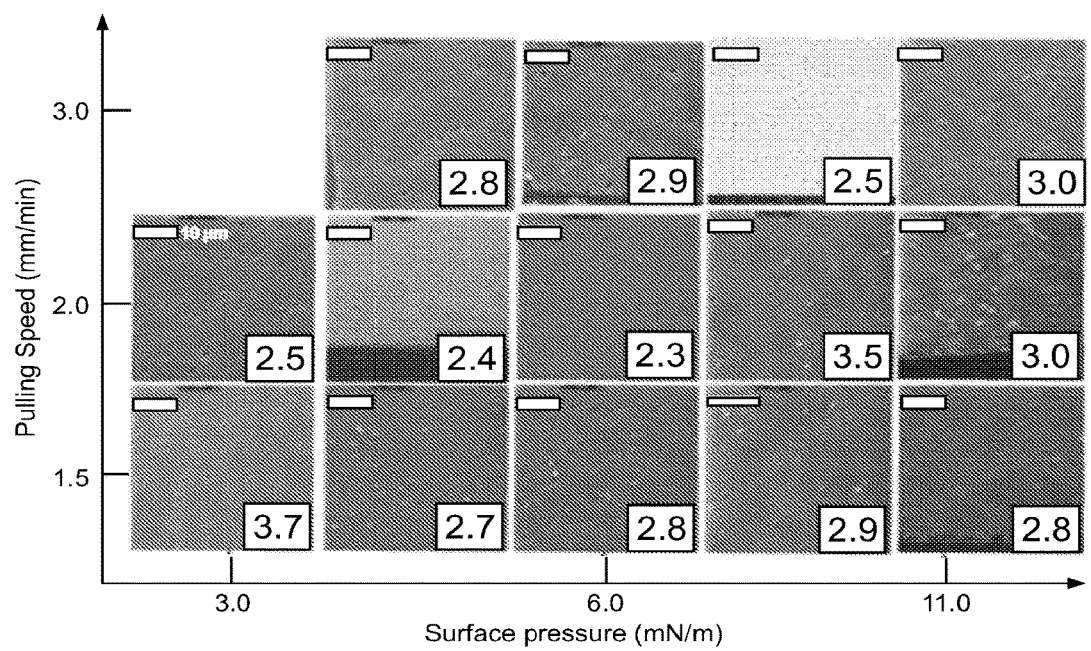
FIG. 4 are SEM images and G parameter values (boxed numbers) in microns for various combinations of the pulling speed and the surface pressure for Langmuir-Blodgett (LB) assembled monolayers.
Figure 5A:
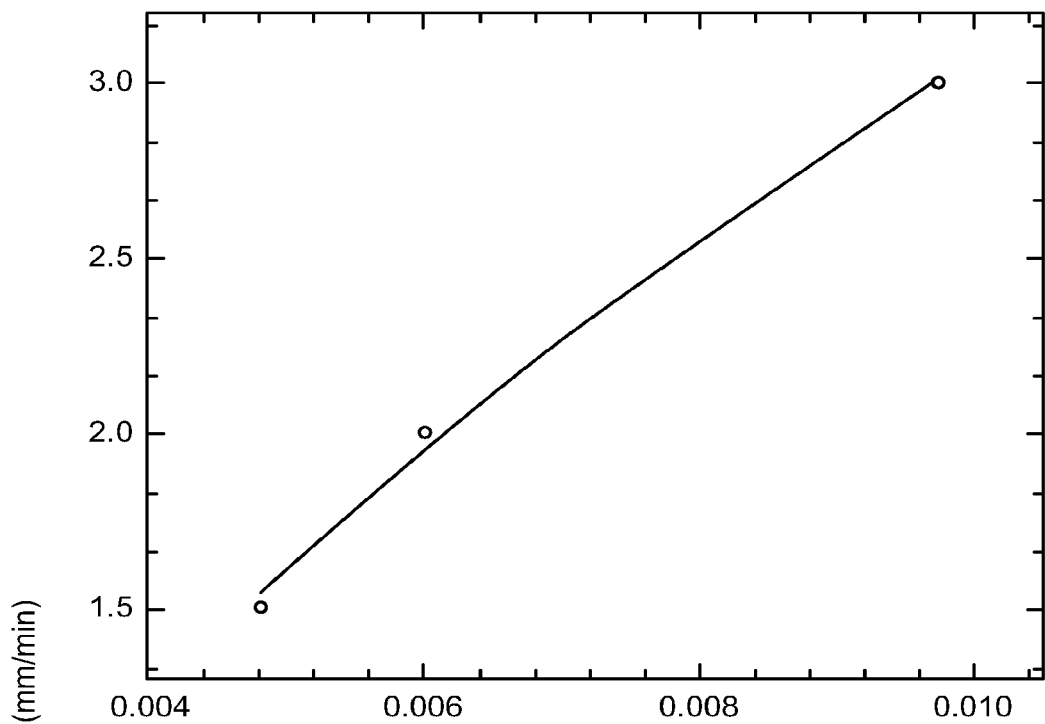
FIGS. 5A and 5B illustrate the optimal pulling speed and the optimal surface pressure for (FIG. 5A) a monolayer and (FIG. 5B) an additional layer assembly. The black square dots show the experimental points where the G value is the greatest and the lines are model predictions.
Figure 5B:
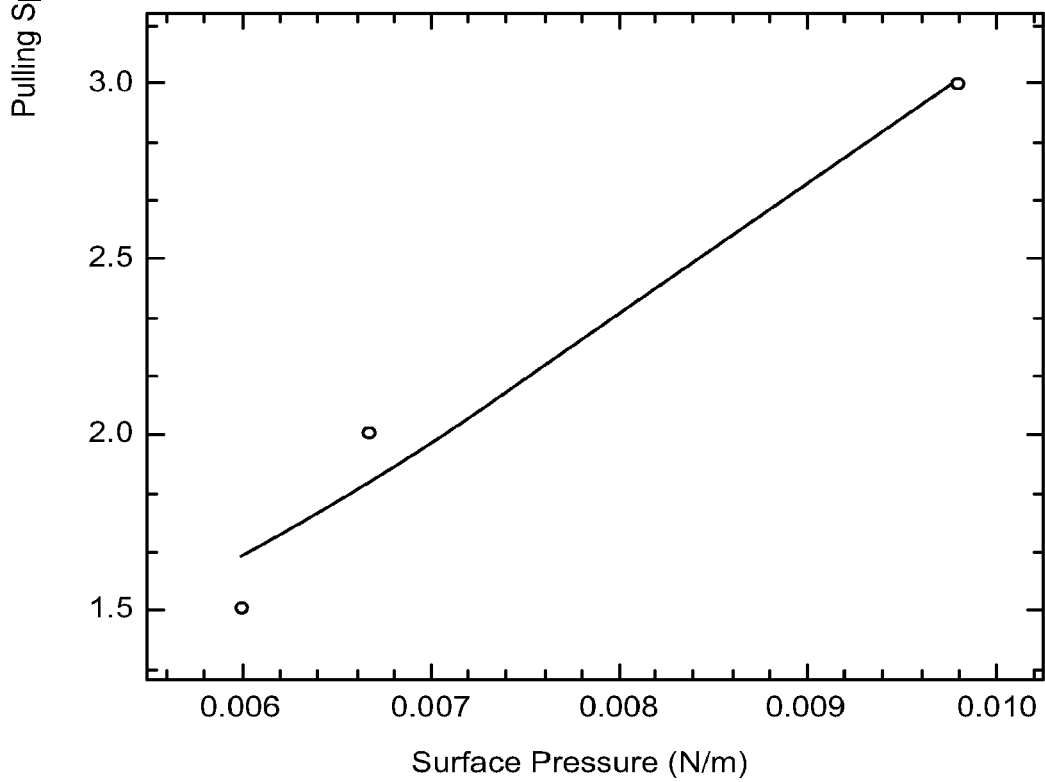

The assembled $SiO_2$ sphere monolayers made in accordance with an embodiment of the present invention were characterized by laser diffraction. The average crystalline domain size, G, was obtained from the laser diffraction pattern. FIG. 4 shows scanning electron micrograph (SEM) images of the $SiO_2$ sphere monolayers with the G values in microns for various combinations of the pulling speed and the surface pressure. The results show that the structural order can be controlled by the latter parameters in the LB process. Moreover, the results agree with model predictions very well. The comparison between the two is given in FIG.

5 where black dots are experimental points at the largest crystalline domain size and the lines are model predictions. At moderate pulling speeds, the required surface pressure increases for the second layer (b) compared to the first layer (a).

In other embodiments, the present invention may vary the pulling speed and surface pressure in each layer in the LB process to control the degree of randomness. The randomness of a layer depends not only on the two parameters but also on the randomness of the previous layer. Sample preparations may be categorized as follows: (1) the two parameters are set to the maximum G condition throughout the multilayers, (2) the parameters are gradually detuned from the condition as the layers are added, and (3) the parameters are initially detuned and are closer to the maximum G condition as the layers are added. Following these methods, the variation of the randomness in the film thickness direction may be controlled.

Sedimentation of colloidal microspheres is known to induce f.c.c. crystals of a long range order with a (111) plane at the film surface. The sedimentation process may be accelerated using a centrifuge without affecting the order. In the sedimentation process, it is difficult to introduce a controlled degree of randomness into the crystals. However, it is possible to create almost completely random arrangement of microspheres by inducing colloidal instability. Colloidal microspheres in suspensions are often charged and the interaction between the spheres becomes repulsive. When the repulsive force dominates the van der Waals attraction force, the colloid is stable. However, when an electrolyte is added to the solution, the repulsive potential barrier is lowered. As a result, the microspheres coagulate when the electrolyte concentration exceeds a limit known as the critical coagulation concentration. This coagulation process leads to random structures. Thus, layers having structures of alternating tiers of order and disorder may be created using the sedimentation process above and below the critical coagulation concentration alternately. A previous study on template directed colloidal self-assembly showed that, when sphere layers are grown on a structure with a lattice plane different than (111), the structure transitions into the (111) plane through the gradual introduction of defects. Based on this, the sedimentation of stable colloids on random structures may result in ordered layers after addition of some number of layers. In this case, an ordered tier may be deposited on a disordered tier using the sedimentation method. Therefore, the present invention advantageously uses this to obtain structures of alternating ordered and disordered tiers using the sedimentation process.

Alternating tiers of ordered and disorders structures may be fabricated using the sedimentation method of the present invention. The scattering properties of the multi-tiered structures based on $SiO_2$ and $TiO_2$ microspheres may be characterized by transmission and reflection measurement.

Figure 6A:
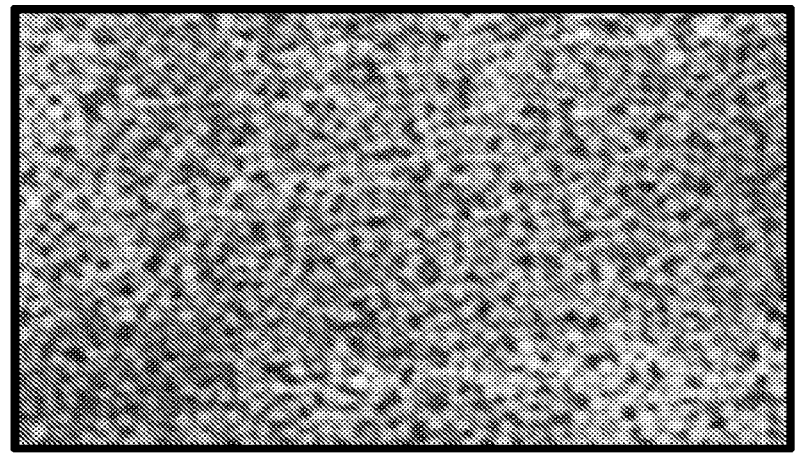
FIG. 6A is an SEM image of disordered microspheres.
Figure 6B:
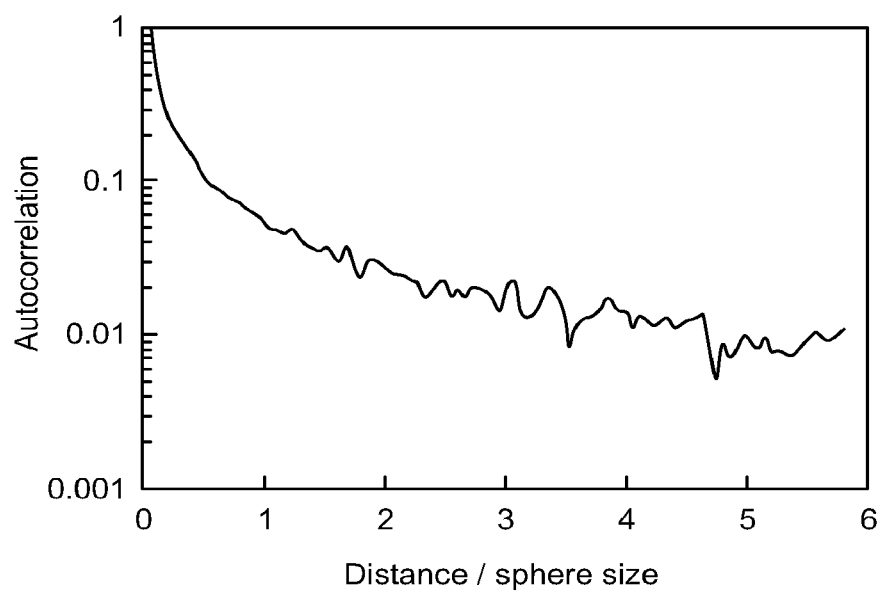
FIG. 6B shows an autocorrelation function obtained from FIG. 6A.

KCl salt solution was added to stable $SiO_2$ microsphere colloids to induce instability. After the solvent was removed, a film of randomly packed microspheres was obtained. FIG. 6A shows an SEM image of the resulting structures. The randomness of the structures was characterized by autocorrelation function as shown in FIG. 6B. The autocorrelation function was obtained by analyzing the image contrast in FIG. 6A over an arbitrarily selected line. The function shows the clear signature of the random structures. Sedimentation without inducing colloidal instability results in well-ordered structures.

In other embodiments, the present invention provides multi-tiered structures of alternating order and disorder using a sedimentation method. For these embodiments of the present invention, the deposition of an ordered film on disordered structures is provided. This may be accomplished by using sediment stable colloids on random structures with different film thicknesses and sedimentation conditions. Ordered $SiO_2$ or $TiO_2$ sphere films may be grown on randomly packed polystyrene spheres. Subsequent selective removal of the polystyrene spheres will result in a film of the ordered $SiO_2$ or $TiO_2$ spheres. The scattering properties of the ordered $SiO_2$ or $TiO_2$ film can be measured to extract the diffusion parameters. The diffusion parameters of the disordered structures can be determined separately with similar measurement on uniform disordered films. The diffusion problem described above may be solved for multi-tiers of alternating order and disorder using the obtained scattering parameters.

Light propagation in well-ordered tiers depends on the photonic band structure. Thus, the actual interaction between the ordered and the disordered tiers will be more complicated than the prediction by the diffusion equation that ignores the spectral dependence of scattering parameters. However, for low index microspheres, the modification of photonic band structure by the structure periodicity will be weak. In this case, the diffusion approximation may be plausible.

Figure 7A:
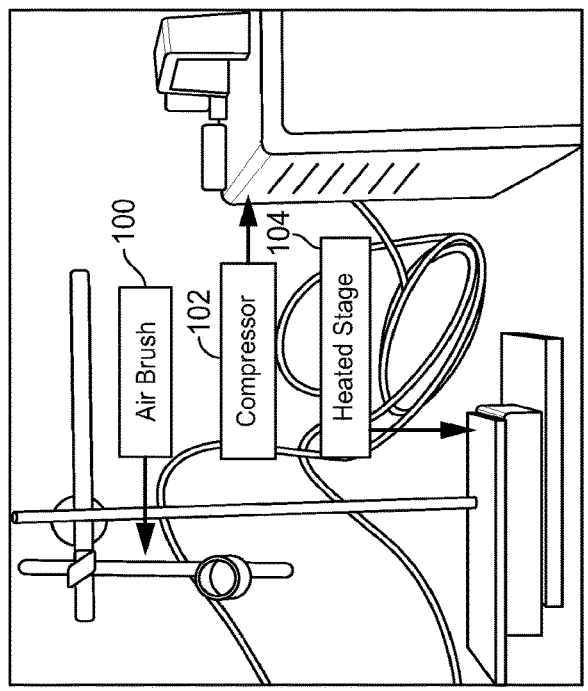
FIG. 7A illustrates a complete assembly of spray-coating apparatus.
Figure 7B:
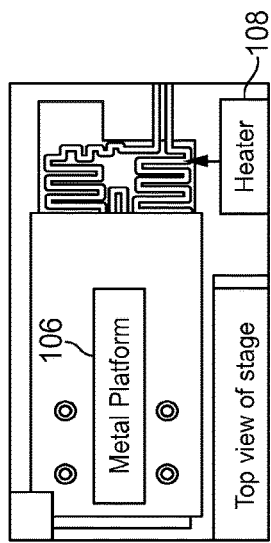
FIG. 7B is a top view of heated stage where the substrate can be placed on the metal platform.
Figure 7C:
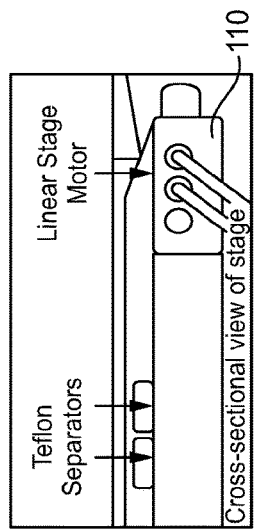
FIG. 7C is a cross-sectional view of the heated, movable stage showing the linear motor.
Figure 7D:
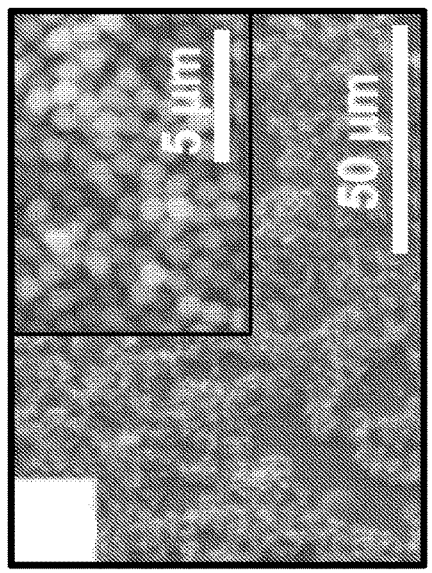
FIG. 7D is an SEM image of microsphere coating with 1 stage cycle.
Figure 7E:
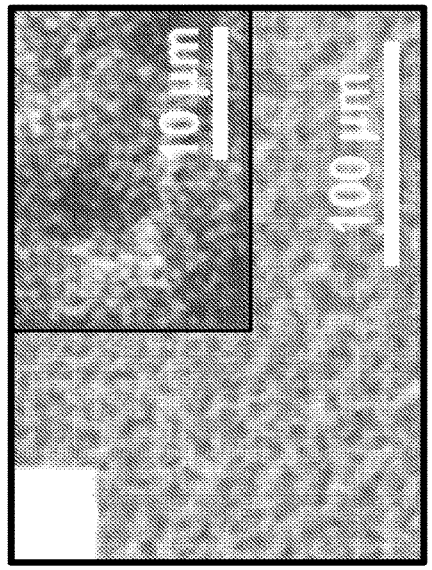
FIG. 7E is an SEM image of microsphere coating with 3 stage cycles.

In a preferred embodiment, as shown in FIGS. 7A-7E, the microsphere suspension can be directly spray-coated onto a substrate with an airbrush pistol to achieve random structures. FIG. 7A shows an apparatus consisting of a gravity-fed airbrush 100 (Badger gravity feed series, Model 100G), an air compressor 102 (Badger, TC910 Aspire Pro), and a custom-built, linear-motion, heated stage 104. Spray deposition can be performed multiple times over the substrate as the stage moves back and forth on a metal platform 106 over heater 108, and the heating dries the fine droplets on the surface in a controlled fashion. The stage temperature and speed of motor 110 are controlled up to 150° C. and 3.6 mm/s, respectively.

The spray process involves a number of parameters such as stage/scan speed, distance of airbrush from the substrate, flow rate, nozzle outlet pressure, and substrate temperature. Substrate temperature is important for the drying dynamics of droplets, in which higher substrate temperatures allow for faster drying of the droplets and prevent coalescence into larger droplet before drying. Stage operating temperatures may be in the range of ~130° C. This temperature is high enough to allow for fast evaporation.

Nozzle outlet pressure and distance from the substrate are other parameters in the deposition process. Increasing pressure results in increasing pressure drop across the nozzle and subsequently increasing fluid velocity through the airbrush. With increasing pressure, liquid dispersion breaks into smaller/finer ligaments and droplets. While nozzle pressure affects the mass flow rate of microsphere suspension, the nozzle distance controls the surface coverage of microspheres deposited onto the substrate. It was determined for a preferred embodiment of the present invention that the nozzle pressure and distance of 20 psi and 10 cm, respectively, allow for fast droplet drying and relatively uniform coats of microspheres after a few stage cycles. See FIGS. 7D-E.

Light scattering in random structures and photonic band gap in periodic structures may have relations to each other. For example, as the refractive index of a constituent material increases, in general, the scattering strength increases in random media and the photonic band gap widens in photonic crystals. For 3D structures, the realization of a complete photonic band gap has proved challenging but a few structures exhibit such a band gap. A well-known example of 3D photonic band gap structures is the woodpile structures of a diamond lattice. The structures consist of layers of 1D rod arrays with the rod direction of a layer rotated by 90° at the next layer. When the periodicity of the structures is destroyed, a random fibrillar network would result. Interestingly, this random structure is recently found in white beetle scales which exhibit the smallest transport mean free path among known random media of low refractive index. The inverse woodpile structures exhibit even a larger photonic band gap than the woodpile structures. Interestingly, the inverse structures of random fibrillar network, namely the random networks of nanopores, achieved the highest light scattering efficiency when first introduced in 1999. While the photonic band gap in the woodpiles or the inverse woodpiles is partly due to the diamond lattice, the strong scattering properties that result when the lattice is disturbed might derive from the network structures. Fibrillar networks resulting from the disturbance of diamond-bonding networks can even exhibit a photonic band gap without the periodicity requirement. While the band gap can be explained by the bonding and antibonding photonic states, it would also indicate extremely strong light scattering of fibrillar networks. However, the origin of such light scattering strength manifested by the small transport mean free paths in the network structures is still largely unknown.

Toward the understanding of the strong light scattering in fibrillar networks, it is important to establish the relationship between the structure and the optical properties. In particular, the transition of the optical properties from periodic to random structures may reveal important physics that relates between the two. The physics may provide insight on how to realize optical Anderson localization in 3D structures with hints from the research in photonic band gap materials. The realization of the Anderson localization has been quite challenging: only a few reports so far claimed success and these reports are still inconclusive because of the complications such as optical absorption. The establishment of the structure-property relationship will also be important in the realization of extremely thin white films using fibrillar networks which would enable paper-thin displays, solar heat management in buildings and space vehicles, etc.

Figure 8:
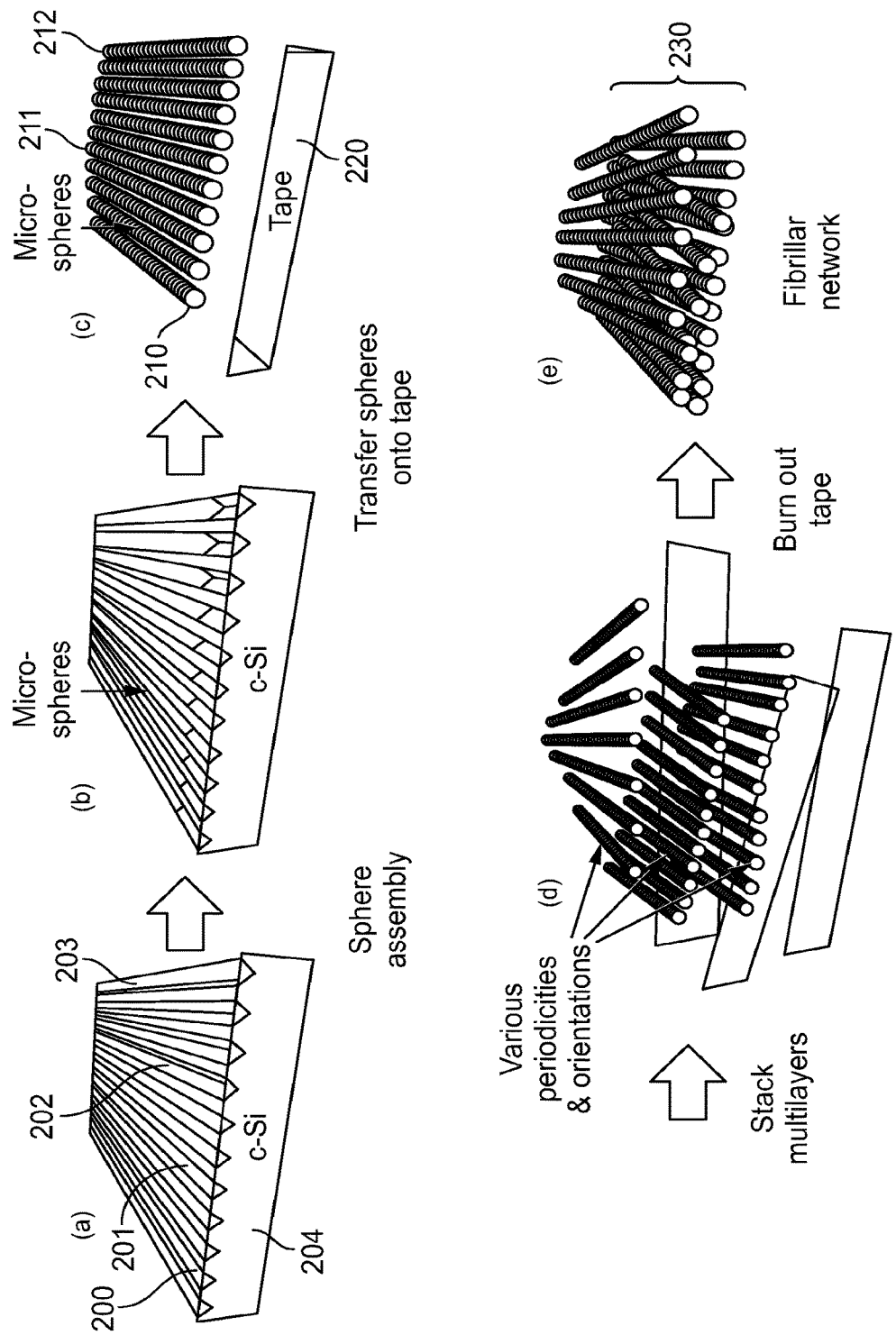
FIG. 8 illustrates a fabrication process for creating fibrillar network structures by microsphere self-assembly.

In other aspects, the present invention provides a method based on self-assembly of $SiO_2$ or $TiO_2$ microspheres to fabricate fibrillar network nanostructures. The method is designed to enable the precise control of the structures. FIG. 8 illustrates the following fabrication process: (step a) periodic grooves 200-203 are patterned on a surface which may be a c-Si surface 204, (step b) microspheres may be deposited on the surface inside the grooves as monolayer chains by template directed self-assembly, (step c) the sphere chain arrays 210-212 may be transferred onto an organic tape 220, (step d) samples of various periodicities may be fabricated and stacked with controlled orientations, and (step e) after burning out the tape, the sphere chain arrays will collapse down and form a disordered network 230 of sphere chains forming a multilayer coating. As shown in FIG. 8E, a coating having 3 layers is formed but other numbers of layers may be used as well. Because the developed method provides precise control on structures, a relationship between the optical properties and the structures may be established.

For one particular embodiment, the present invention patterned c-Si surfaces using interference lithography and deposited spheres on the grooves using the LB method as shown in FIG. 9. A simpler spin coating can also be used. After the sphere chains were prepared on c-Si surfaces, the tape was burned out.

To obtain 1*, 1, and R for various combinations of the periodicity distribution, the sphere filling fraction, and the sphere chain orientation may be used. The sphere filling fraction was fixed using monodisperse spheres. The distribution of the in-plane periodicity may be varied in the thickness direction with isotropy to achieve almost completely random scattering. Once the periodicity distribution is determined, a structure that consists of a periodic stack and a random stack was fabricated. FIG. 10A illustrates the structure schematically with ordered layers 300-305 and disordered layers 310-315. This structure will be compared to a uniform scattering structure in FIG. 10C that consists of the same in-plane layers with a different distribution in the thickness direction. The uniform structure in FIG. 10C represents the complete mixing of the periodic stack and the random stack. The intermediate mixing of the two stacks may be realized by a number of different distributions of the same in-plane layers. An example of the intermediate mixing is shown in FIG. 10B. Assuming that the resulting structure can be regarded as a uniform diffusive medium, the mean free paths will be obtained to show how the mean free paths depend on the distribution of the in-plane periodicities. This will reveal how the mean free paths increase as a random structure is "diluted" by mixing with a periodic structure. Based on the results the "dilution" path that gives the slowest and the fastest increase of the mean free paths may be determined. To use the results as a means to finding extremely strong scattering structures, the original undiluted random structure shown in FIG. 10A may be viewed as a structure that is diluted from unknown more "concentrated" structures. This view is similar to treating the FIG. 10B structure as one that is diluted from the FIG. 10A structure. In this case, the layers with the average periodicity in the original random structure can be identified as a periodic "solvent".

In yet other embodiments, the present invention concerns ways in which the transport mean free path, 1*, may be changed or altered as desired. For example, the 1* for layers 310-315 in FIG. 10A is smaller than the 1* for layers 310-315 in FIG. 10B as a result of adding ordered layers in 312 and 313. In turn, the 1* for layers 310-315 in FIG. 10C is even greater than the 1* for layers 310-315 in FIG. 10B as a result of adding even more ordered layers in 311, 312 and 314.

As is also shown, an ordered layer as shown in FIG. 9 may be used to create an ordered layer in a tier such as layer 305 for example. Layer 305 in FIG. 10A may be created by exfoliating or otherwise transferring the layer shown in FIG. 9 to the tier.

The same steps may be used with different sphere filling fractions. For each filling fraction, the structures of the least transport mean free paths may be determined. These will determine the filling fraction dependence of the mean free paths. They will also determine the optimum filling fraction for the smallest mean free paths for both $SiO_2$ and $TiO_2$ microspheres.

In other embodiments of the present invention, the anisotropy of the optimum structures may also be determined to minimize the mean free paths as suggested by the structures in white beetle scales.

In still further embodiments, the present invention provides scattering material that can be made to scatter light even more strongly than know before. Conversely, in other embodiments, the present invention shows how to mitigate the scattering strength of a material in a highly controlled fashion based on the relation between the order-disorder mixing and the scattering properties and the ability to control the scattering properties of materials precisely.

The structures based on microsphere chains can model the actual morphology of fiber or pore networks that are found to provide extremely strong scattering. Such morphologies include, but are not limited to, curved sphere chains with non-uniform cross-sections. As illustrated in FIGS. 11A and 11B, when grooves are wider than the sphere size, self-assembly will result in non-straight chains (FIG. 11B) as the spheres are connected by capillary forces.

The kinked chain of FIG. 11B has a higher degree of randomness than the linear chain shown in FIG. 11A. As a result, where desired, kinked chains may be used or introduced to lower the transport mean free path, l*.

Moreover, using microspheres with polydispersity, randomly non-uniform cross-sections in the fibrils was realized for certain embodiments of the present invention. These concepts may also be applied to the linear-chain structures that are found to exhibit very small transport mean free paths.

In one embodiment of the present invention, the primary materials for the microspheres may be $SiO_2$ and $TiO_2$, which have refractive indices of 1.45 and 2.5 (anatase), respectively. However, the dependence of the refractive index on the scattering properties will not be limited to these two indices. Once the solid structures are fabricated, the structures may be infiltrated with a liquid with a known refractive index to control the refractive index contrast. The refractive index of the liquid may be controlled by mixing low and high index liquids in varied ratios. Without liquid infiltration, it is possible that the structures made of $TiO_2$ microspheres exhibit Anderson localization because of the high refractive index.

In radiative cooling under sunlight applications, scattering is generally desired to reduce sunlight absorption by the material underlying the scattering coating. For cooling, it is important to achieve high emissivity in the mid-IR. The high emissivity is not affected much by the structures because the sphere size is much smaller than the wavelength of mid-IR radiation. Rather, the emissivity will be determined mostly by the sphere filling fraction and the sphere materials. In principle, the sphere filling fraction can be controlled by various methods such as the one that fabricates fibrillar networks described above. However, in real applications, manufacturability of the structures should be considered. In this respect, the fabrication methods based on colloidal instability or spray coating would be more suitable. Because the sphere filling fraction of the structures obtained by these methods would have a quite limited range, the emissivity control will not be easy in real applications. In fact, the embodiments of the present invention have achieved a very high emissivity.

In one embodiment, the present invention deposits uniform random structures of microspheres on materials mostly using the techniques of colloidal instability and spray coating. The solar absorptivity and mid-IR emissivity of the samples may be measured at various random structure coating thicknesses, sphere materials, and coating conditions.

Solving the diffusion problem described above, the solar absorptivity for random $SiO_2$ microspheres on absorbing materials was calculated. For initial estimation, an expected transport mean free path of l*=3 µm and filling fraction of 55% was used. For the front surface, the proper internal reflectance was taken into account. For the internal reflectance at the interface between the microsphere coating and the absorbing material, $R_s$, two extreme values of 0 and 0.96, which represent an ideal black body and a good metal, respectively were selected. The actual internal reflectance for a good metal would not reach as high as 0.96 because of the excitation of surface plasmon polaritons. The calculated solar absorptivity as a function of the coating thickness is shown in FIG. 12. In general, absorptivity decreases as the coating thickness increases because of the light scattering in the coating. The effect of the interface reflectance on the absorptivity diminishes as the coating becomes thicker. FIG. 12 shows that absorptivity for a sphere-coated black body is only 3.4% when the coating thickness is 200 µm. With $TiO_2$ microspheres, the absorptivity would be even less because of the stronger scattering.

In yet another embodiment of the present invention, uniform random $SiO_2$ spheres of a diameter 900 nm were coated on a Ag film using the method of colloidal instability and measured absorptivity using an integrating sphere. Absorptivity increases as the wavelength increases. The spectral dependence of absorptivity suggests that the addition of more layers of larger spheres may be more efficient in reducing absorptivity in the near-IR. The measured absorptivity (~0.15) is larger than the value (~0.05) calculated with $R_s$=0.96 partly due to the excitation of surface plasmon polaritons. However, it was found that the measurement had an error of ~0.1 in reflectance and transmittance. A recent study reported a similar level of error for the similar measurement system. While the error was attributed to the light lost in the sample holder in the past study, the analysis indicates that the scattered light was not completely collected by the integrating sphere.

Figure 14A:
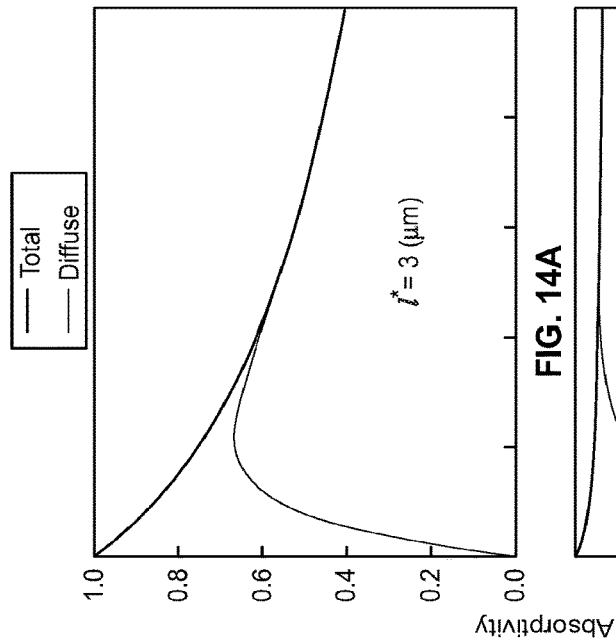
FIGS. 14A and 14B illustrates absorptivity in semi-infinite Si substrate with a perfect antireflection coating due to diffuse light and to both diffuse and ballistic light when $SiO_2$ microspheres are placed on top.
Figure 13:
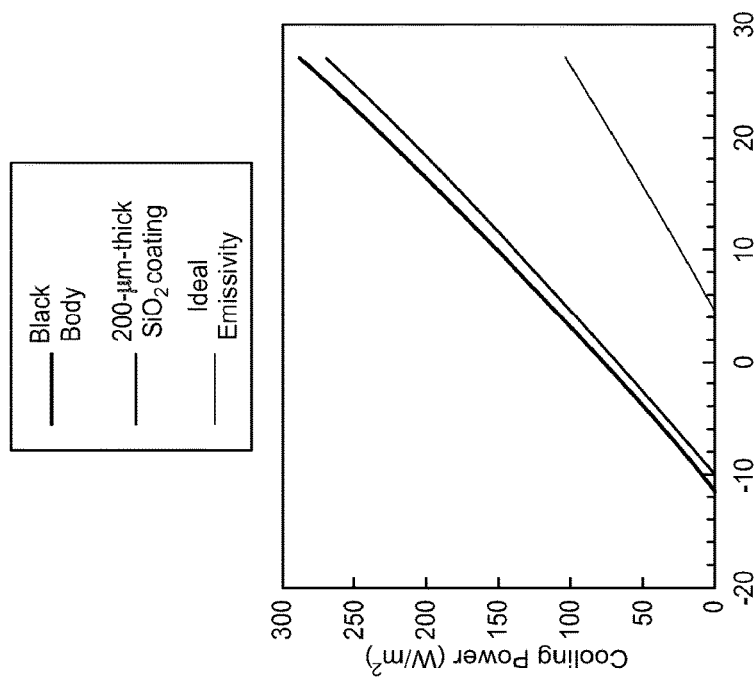
FIG. 13 illustrates cooling power as a function of the temperature of various materials when the ambient temperature is 27° C. The black body and the ideal emissivity refer to mid-IR spectrum only. The solar absorptivity of the materials is 0.034, the same value as the $SiO_2$ coating.

The mid-IR emissivity of a $SiO_2$ spheres on a Ag film may be measured. The measurement gives an average emissivity with the room temperature black body radiation spectrum as a weighting function. The emissivity is also averaged over the hemispherical solid angle. The measurement gave an emissivity of 0.943 which is already very high Based on the measured emissivity (0.943) and the predicted absorptivity (0.034), the cooling power in Eq. (5) for a random $SiO_2$ sphere coating on a black body (black over the solar spectrum) was calculated. The use of the constant mid-IR emissivity may introduce errors in the cooling power and the spectral measurement of emissivity will correct the errors. For the convection and conduction term, the heat transfer relation $P_{other}=\kappa(T_{amb}-T)$ was used where $\kappa$=2.5 W/(m²K) is the measured value for a device in a past study. The predicted cooling power when the coating thickness is 200 µm and the ambient temperature is 27° C. is given as the middle line in FIG. 13. The cooling power of the coating is slightly below a mid-IR black body and significantly higher than an ideal emissivity discussed above. While the cooling power decreases most slowly in the case of the ideal emissivity as temperature decreases, its magnitude is less than a mid-IR black body. The lower cooling power of the ideal emissivity is due to the fact that the low mid-IR emissivity of the atmosphere is not limited to 8≤λ≤13 µm as seen in FIG. 2. At steady state, the temperature of the material will reach a point where the cooling power becomes zero. FIG. 14 shows that, under direct sunlight, the material with the coating will reach the temperature of −10° C., which is 37° C. below the ambient temperature. When the material is not a black body (black over the solar spectrum), its temperature will be even lower than −10° C. When the emissivity spectrum predicted from effective medium theory as in FIG. 3 is used instead of a constant 0.943, the predicted material temperature is −9.4° C. which is very close to −10°

C. For simple processing, the colloidal instability method and spray coating to deposit the sphere layer was used. The coating may be a uniform random structure.

As in the previous section, the mid-IR emissivity of the solar cell coatings are mostly determined by the sphere materials and the sphere filling fraction. When absorption is too small, the efficiency will be low. In the opposite case, however, it is not clear if the maximum absorption will achieve the highest efficiency because of the increase in the cell temperature. The temperature dependence and the absorption dependence of the photovoltaic efficiency will be different for different cells. To maximize absorption, the microspheres will radiatively cool the cells, which is always an advantage while the optimum absorption is not clear. To determine the desired distribution of randomness in the tiered coatings for efficient light trapping, the diffusion equation may be used by a microsphere-based coating of a uniform randomness on a semi-infinite Si substrate with a perfect antireflection coating. The diffusion problem was solved for this structure to obtain absorptivity as a function of the coating thickness. The results are displayed in FIG. 14 for (a) l*=3 µm and (b) l*=200 µm. Here, absorption by diffuse light is shown by the lower line and total absorption is shown by the upper line. In both cases, total absorption decreases as the coating becomes thicker and the diffuse absorption exhibits a maximum. When the coating is thick enough, absorption is mostly due to diffuse light. For thin Si films, diffuse absorption should be maximized for efficient light trapping. FIG. 14 shows that the maximum diffuse absorption is only 0.67 for the strong scattering (a) but is as large as 0.94 for the weak scattering (b). The required coating thickness for the two cases is 2.2 µm and 5.2 µm, respectively. The results indicate that, for efficient light trapping, weak-scattering thick structures are desired rather than strong-scattering thin structures.

For a flat Si surface, the diffuse light is not completely randomized inside the Si layer. Instead, due to Snell's law, the direction of the diffuse light inside Si is confined within a cone defined by $\theta=\sin^{-1}(1/n)$ where $\theta$ is the angle from the surface normal and n is the index contrast between Si and the coating. Thus, for efficient light trapping, the effective index of the coating should be high. However, typical non-absorbing materials for microspheres exhibit a refractive index lower than Si and $\theta$ is less than 90°. For the Lambertian light trapping, the Si surface should be corrugated. Because the coating generates diffuse light, the corrugation does not have to be deep. When the corrugation is only shallow, the loss of expensive photoactive layer by corrugation will be minimal. Therefore, efficient light trapping in semiconductor-based solar cells requires weak-scattering thick coatings on slightly corrugated surfaces with an antireflection coating.

Figure 14B:
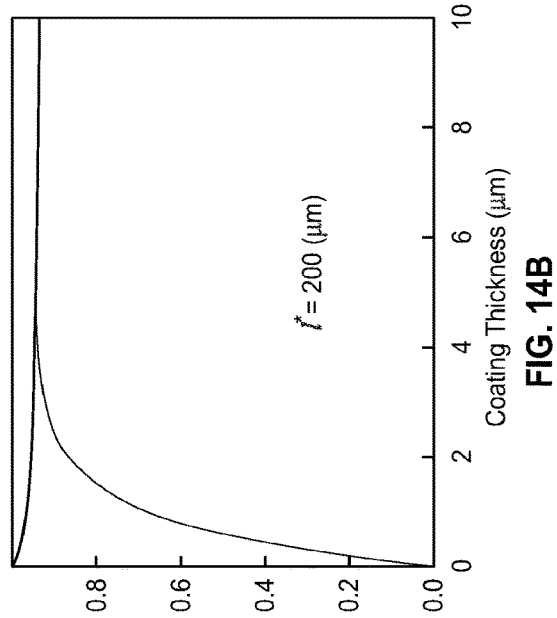

The example of l*=200 µm in FIG. 14B represents highly ordered structures. The desired structures of tiered randomness will maximize diffusive intensity at the semiconductor interface while minimizing reflection loss. Semiconductor surfaces may be slightly corrugate to maximize light trapping. For the corrugation, periodic structures with controlled depths of corrugation may be used. In other embodiments, the surface of working solar cells will be corrugated, an antireflection coating will be applied on the surface, and the microspheres will be coated on top.

In yet other embodiments, coatings are provided that effectively and efficiently scatter sunlight. The scattering strength may be characterized by the so-called transport mean free paths (l*). The transport mean free path is the length over which light loses its memory of original direction while traveling in a scattering medium. Approximately, solar absorption is linearly proportional to l* in thick coatings. l* depends on both the particle diameter d and the filling fraction f. For randomly packed single size spheres, f ranges between 0.55 and 0.64. A powerful method to determine l* is coherent potential approximation (CPA), which is known to be highly accurate for any f. The calculated l* for the two extreme values of f in randomly packed $SiO_2$ spheres of 0.9 µm in diameter d is compared in FIG. 15. The results should be between the two predicted values and is closer to the prediction for f=0.64. The CPA predictions of t agree remarkably well reproducing even the detailed spectral features. Because l* increases as the light wavelength $\lambda$ increases in this case, absorption will also exhibit the same trend when the microsphere-based coating is placed on an absorbing material. For example, when a microsphere coating of a thickness L=700 µm is on a black body, absorption A≈2l*/L is expected to be 0.7% and 11% at $\lambda$=0.4 µm and 2.5 µm, respectively. Therefore, with the d=0.9 µm microspheres, solar absorption in the near IR is significant and this increases the temperature of a material underneath the coating. Commercial paints also suffer from IR absorption by materials underneath the paints in even higher degrees.

Figures 15, 16, 17:
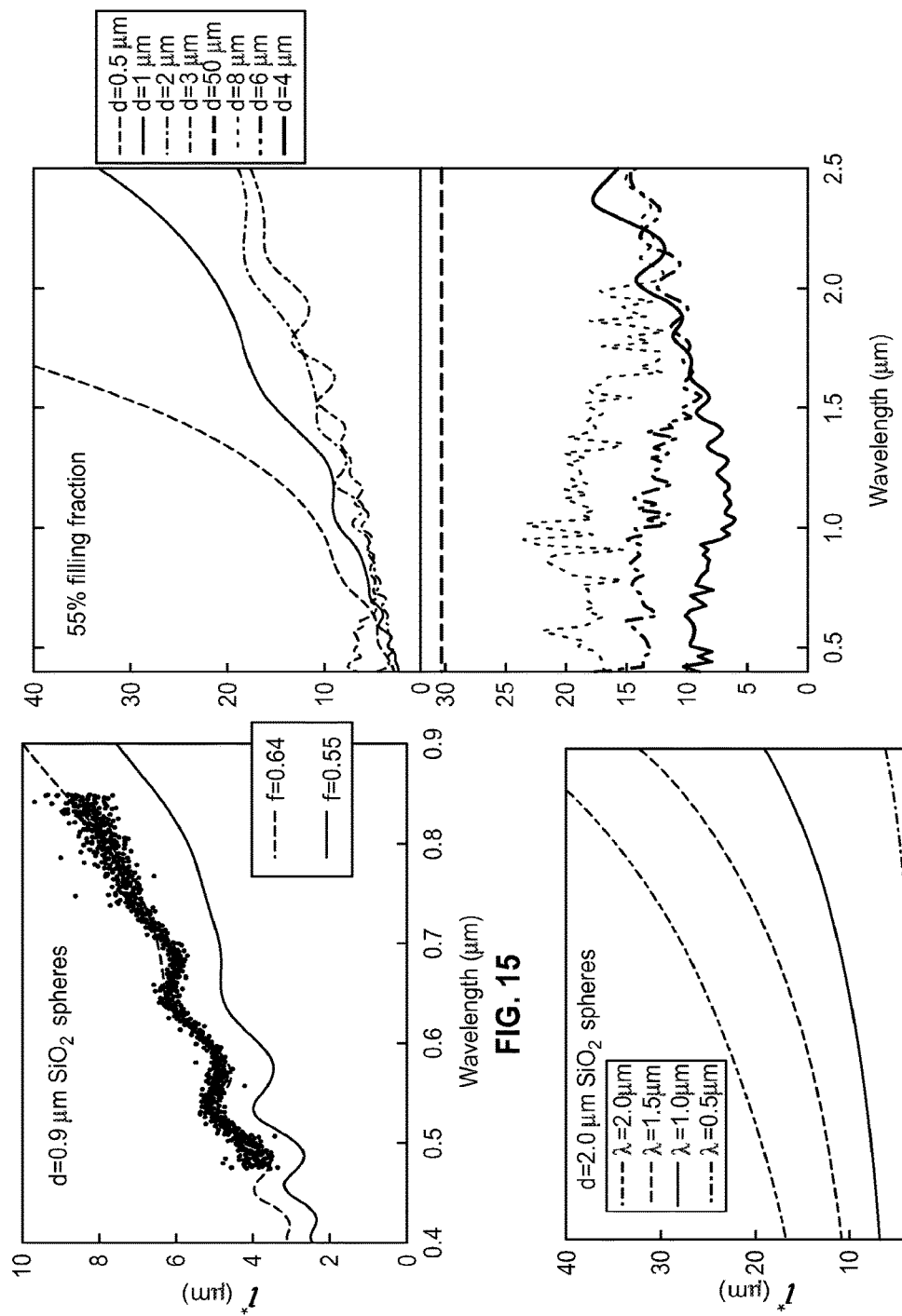
FIG. 15 is a comparison of experimental results and CPA prediction of l* for randomly packed $SiO_2$ microspheres of a 0.9 μm diameter. Predictions are given for two extreme values of filling fraction 0.55 and 0.64 for randomly packed single size spheres.
FIG. 16 illustrates l* spectra at various sphere diameters d when the filling fraction is 55%.
FIG. 17 is a CPA prediction of l* as a function of $SiO_2$ microsphere filling fraction in random packing at selected light wavelengths in the solar spectrum.

The near IR absorption can be reduced by using different size spheres. FIG. 16 shows calculated l* in the solar spectrum at various sphere diameters. It is revealed that l*, hence solar absorption, is minimized when the sphere size is d=4 µm. In general, l* decreases as d increases up to 4 µm with the effect being most pronounced in the long wavelengths. When d is larger than 4 µm, l* increases as d increases primarily in the short wavelengths. When d is much larger than $\lambda$, l* can be estimated based on the theory developed by Kubelka-Munk and Brewster-Tien. The estimation gives $$l^* \cong \frac{d}{3f}.$$

Thus, l* is linearly proportional to d for large spheres.

For example, when d=50 µm, l* is estimated to be 30.3 µm. Popular low refractive index pigments used in commercial solar reflective paints are of a shape of hollow spherical shells of d=20-150 µm. Therefore, the sphere size of popular commercial paints based on low refractive index pigments leads to much weaker light scattering than the coatings of the present invention.

Brewster-Tien criterion says that, when spheres are large enough, the filling fraction of spheres does not significantly affect the scattering efficiency of each particle. However, for small size spheres, it has been reported that light scattering strength is maximized at a sphere volume fraction of roughly around f=0.2.[8] Because the filling fraction in random packing is larger than this value, the dependence of l* on f for random packing was analyzed. FIG. 17 shows this dependence at selected wavelengths in the solar spectrum when the diameter of $SiO_2$ spheres is 4 µm. The region of f>0.64 corresponds to the case where microspheres are sintered. Overall, l* increases as f increases, while an opposite behavior is observed at short wavelengths. The spectral average of l* is minimum at f=0.55. Thus, for maximum scattering of sunlight, it is desired to minimize the sphere volume fraction in random packing.

The cooling effect of white coatings can be characterized by l* averaged with a solar spectrum as a weighting factor.

This average <l*> is approximately proportional to the solar power absorbed by the material underneath a coating, $P_{sun}$, because $$P_{sun} = \int A(\lambda)I(\lambda)d\lambda \cong \int \frac{2l^*(\lambda)}{L}I(\lambda)d\lambda = \frac{2}{L}\langle l^*\rangle \int I(\lambda)d\lambda,$$

where $l(\lambda)$ is the sunlight spectrum and <l*> is defined by $$\langle l^*\rangle \equiv \frac{\int l^*(\lambda)I(\lambda)d\lambda}{\int I(\lambda)d\lambda}$$

Figure 18:
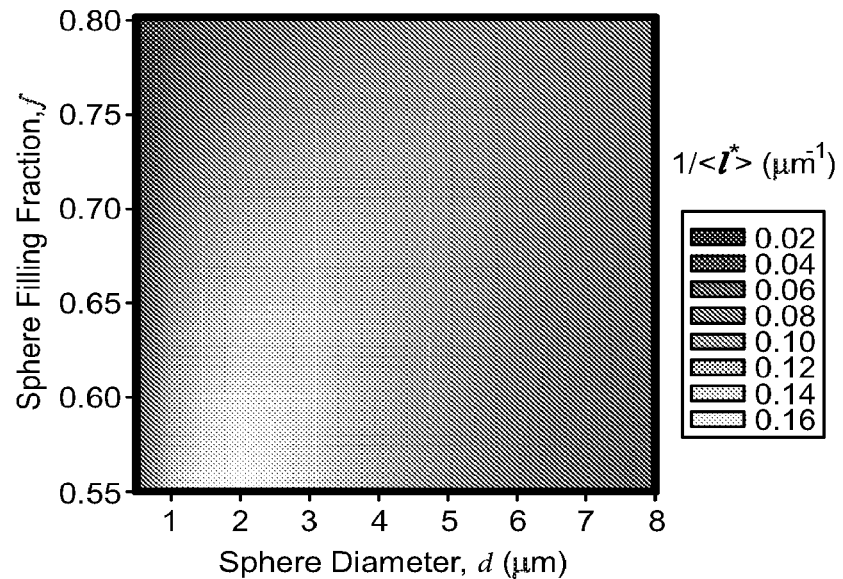
FIG. 18 illustrates dependence of the sunblock power, 1/<l*>, on the diameter and filling fraction of randomly packed $SiO_2$ microspheres.
Figure 19A:
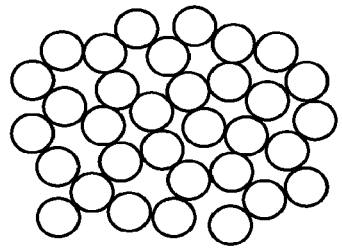
FIGS. 19A and 19B are schematic illustrations of sphere polydispersity effect on filling fraction.
Figure 19B:
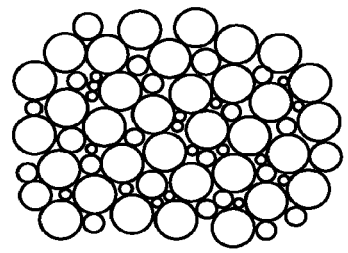

FIG. 18 shows $1/\langle l^*\rangle$, which is a measure of sunblock performance, as a function of d and f for $SiO_2$ microspheres. The maximum sunblock performance is obtained when d=4 μm and f=0.55. The optimum f corresponds to the minimum achievable value for random sphere packing. It is known that, as the sphere size distribution becomes wider, the sphere fraction decreases. This is schematically illustrated in FIG. 19. In FIG. 19, the sphere filling fraction is low when monodisperse spheres are randomly packed (left) and is high when polydisperse spheres are packed (right). Thus, it is desired that the spheres are monodisperse to maximize the sunblock power of the coatings. Current commercial paints based on pigments of a low refractive index consist of highly polydisperse particles ranging from 20 to 150 μm in size. At these large sizes, polydispersity is desirable for light scattering because, based on the relation $$l^* \cong \frac{d}{3f},$$

increase in f results in decrease in l*. However, for sphere sizes near the optimum for sunblock, monodisperse spheres are desired.

$TiO_2$-based paints exhibit optical characteristics that are different from $SiO_2$ microspheres because of the high refractive index of the pigments. Paints based on rutile $TiO_2$ particles typically include binders and fillers. The refractive indices of the medium materials and the rutile $TiO_2$ particles are approximately 1.5 and 2.8, respectively. Commercial solar reflective $TiO_2$ paints use particles of 200-250 nm in size to maximize scattering in the visible wavelengths. However, solar spectrum includes more than a half of the power in the near IR spectrum $\lambda>700$ nm and the $TiO_2$ particles of the size range are not efficient in blocking IR sunlight.

Figure 20:
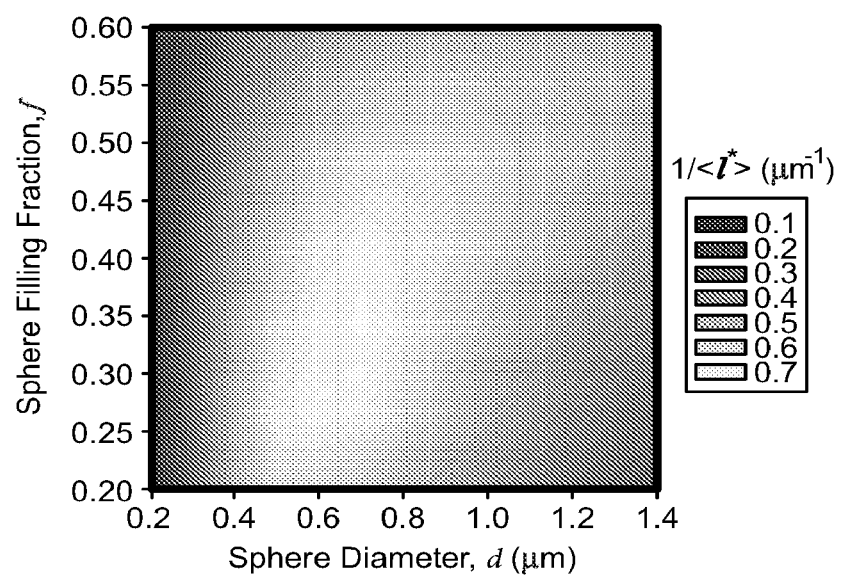
FIG. 20 illustrates dependence of the sunblock power, 1/<l*>, on the diameter and filling fraction of randomly packed $TiO_2$ microspheres in a medium of refractive index 1.54.

FIG. 20 shows the dependence of $1/\langle l^*\rangle$ on the $TiO_2$ sphere diameter and filling fraction. The refractive indices of the medium material and the $TiO_2$ particles are set to 1.54 and 2.74, respectively. Sunblock performance is maximized when the particle diameter is 1 μm and the filling fraction is 26%. Current commercial paints with a $TiO_2$ particle diameter of 200-250 nm show much smaller sunblock performance for all filling fractions between 0.2 and 0.6. To verify the results, the temperature of a silicon wafer when coated with a commercial $TiO_2$-based paint was measured. Electron micrographs of the paint confirmed that the particle size is 200-250 nm. For comparison, a silicon wafer is coated with randomly packed $SiO_2$ spheres of d=0.9 μm. The two samples had a similar coating thickness and were exposed to direct sunlight. To minimize convective heat transfer, the samples were housed in a box made of a transparent film. The sample with a commercial $TiO_2$-based paint was 8° C. higher than the one coated with $SiO_2$ spheres. Calculated l* was 45 μm and 19 μm for the $TiO_2$ commercial paint and the $SiO_2$ sphere packing, respectively. Therefore, the calculation is consistent and when a paint with $TiO_2$ particles of d=1 μm is used, l* is only ~2 μm which is more than 20 times smaller than that of the commercial paint.

In yet other embodiments, for efficient light scattering, the present invention uses hollow microspheres that consist of nanoshells. These hollow microspheres are directly mixed with binders that are typically used for paints. In a preferred embodiment, the binders are polymeric materials. The contrast in refractive index between the binder and the air inside the hollow microspheres is used for efficient light scattering. In this case, the size range of the hollow microspheres is 1-3 microns and the nanoshell thickness is on the order of 1-10 nm.

In yet other embodiments, rather than have the coatings described above being cooled by radiating thermal energy in the mid-IR spectrum, the present invention may be comprised of a substrate that may be in the form of a sheet that is transparent in the mid-IR spectrum and efficiently scatters sunlight. In this embodiment, the object under the sheet is cooled under sunlight, rather than the substrate itself. The substrate functions both as a sunlight blocker and a mid-IR window for the object. In operation, the object will lose heat by thermal radiation that passes through the substrate into the space in the universe, while not being heated by sunlight. The substrate of this embodiment may be made of polyethylene that is transparent to the mid-IR spectrum.

In yet other embodiments, the fabrication of a polyethylene substrate can be accomplished by the use of fiber spinning, the deposition of polyethylene microspheres, or the formation of microbubbles within a polyethylene sheet/substrate. In yet other embodiments, the present invention may co-deposit polyethylene with other materials that are subsequently etched away. For example, polyethylene and another polymer is co-deposited by using fiber spinning and the polymer is selectively etched. Similarly, polyethylene microspheres are mixed with the microspheres of other materials. After the microsphere mixture is deposited by spraying or colloidal methods, the microspheres of other materials are selectively etched. For microbubble formation, similar techniques can be used.

In still further embodiments, thermochromic pigments may be used in the microsphere coatings of the present invention. These coatings are configured to become dark when the atmosphere is cold and bright when warm. For these embodiments, the coating will cool down in summer and warm-up in winter.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiments, methods, and examples, but by all embodiments and methods within the scope and spirit of the disclosure.

What is claimed is:

1. A tiered structure for cooling a surface of a substrate by light scattering comprising:
    a plurality of successive layers;

each of said layers comprised of a plurality of spheres arranged to form a structure comprised of randomly packed spheres;

each structure of each layer has a different arrangement of randomly packed spheres to create to a different light scattering property in each of said layers; and wherein said structures are formed by randomly packed spheres and said spheres have a uniform diameter.

2. The tiered structure of claim 1 wherein said tiered structures emits light in a range of 8-13 microns.

3. The tiered structure of claim 2 wherein said tiered structure also emits light in a range of 18-30 microns.

4. The tiered structure of claim 1 wherein each of said layers has a fixed periodicity and the periodicity of each layer is different.

5. The tiered structure of claim 1 further including multilayers of spheres with a predetermined degree of randomness.

6. The tiered structure of claim 1 wherein each of said layers is made of a monolayer of microspheres with a predetermined degree of randomness.

7. The tiered structure of claim 1 wherein each of said layers has a sphere filling fraction of less than 55%.

8. The tiered structure of claim 1 wherein each of said layers has a sphere filling fraction between 20-45% and said spheres have a diameter between 0.4 and 1 micron.

9. A tiered structure for cooling a surface of a substrate by light scattering comprising:

a plurality of successive layers;

each of said layers comprised of a plurality of spheres arranged to form a structure comprised of randomly packed spheres;

each structure of each layer has a different arrangement of randomly packed spheres to create to a different light scattering property in each of said layers;

said layers are comprised of lateral periodic structures and non-periodic structures; and said periodic layers are ordered structures and said non-periodic structures are random structures.

10. A tiered structure for cooling a surface of a substrate by light scattering comprising:

a plurality of successive layers;

each of said layers comprised of a plurality of spheres arranged to form a structure comprised of randomly packed spheres;

each structure of each layer has a different arrangement of randomly packed spheres to create to a different light scattering property in each of said layers;

each of said layers has a fixed periodicity and the periodicity of each layer is different; and each of said layers has spheres joined into fibrillar networks and said fibrillar networks of each layer have different periodicities and orientations.

* * * * *

UNITED STATES PATENT AND TRADEMARK OFFICE
CERTIFICATE OF CORRECTION

PATENT NO. : 10,514,215 B2  
APPLICATION NO. : 15/768829  
DATED : December 24, 2019  
INVENTOR(S) : Sang Eon Han and Sang M. Han Page 1 of 1

It is certified that error appears in the above-identified patent and that said Letters Patent is hereby corrected as shown below:

On the Title Page

Item (54) and in the Specification Column 1, Line 2, Replace "Radioactive" with "Radiative"

Signed and Sealed this  
Eighteenth Day of March, 2025

Coke Morgan Stewart  
*Acting Director of the United States Patent and Trademark Office*